(12) United States Patent
Bashkirov et al.

(10) Patent No.: US 11,869,237 B2
(45) Date of Patent: Jan. 9, 2024

(54) MODULAR HIERARCHICAL VISION SYSTEM OF AN AUTONOMOUS PERSONAL COMPANION

(71) Applicant: Sony Interactive Entertainment Inc., Tokyo (JP)

(72) Inventors: Sergey Bashkirov, San Mateo, CA (US); Michael Taylor, San Mateo, CA (US); Javier Fernandez-Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 1134 days.

(21) Appl. No.: 15/721,637

(22) Filed: Sep. 29, 2017

(65) Prior Publication Data

US 2019/0102667 A1    Apr. 4, 2019

(51) Int. Cl.
| | | |
|---|---|---|
| *G06N 5/022* | (2023.01) | |
| *G06V 20/20* | (2022.01) | |
| *G06F 18/243* | (2023.01) | |
| *G06V 10/764* | (2022.01) | |
| *G06N 3/004* | (2023.01) | |
| *G06N 3/08* | (2023.01) | |

(52) U.S. Cl.
CPC ........ *G06V 20/20* (2022.01); *G06F 18/24323* (2023.01); *G06N 3/004* (2013.01); *G06N 3/08* (2013.01); *G06N 5/022* (2013.01); *G06V 10/764* (2022.01)

(58) Field of Classification Search
CPC .......... G06N 3/004; G06N 3/08; G06N 5/022; G06K 9/6282
See application file for complete search history.

(56) References Cited

U.S. PATENT DOCUMENTS

| | | | | |
|---|---|---|---|---|
| 2014/0270347 A1* | 9/2014 | Xu | ..... | G06F 18/24323 |
| | | | | 382/199 |
| 2017/0046613 A1* | 2/2017 | Paluri | ..... | G06N 3/045 |
| 2017/0091953 A1* | 3/2017 | Bleiweiss | ..... | G06V 20/52 |
| 2017/0293198 A1* | 10/2017 | Kim | ..... | G02F 1/29 |
| 2018/0018590 A1* | 1/2018 | Szeto | ..... | G06N 20/00 |

OTHER PUBLICATIONS

Xue et al., Deep Classification in Large-scale Text Hierarchies, 31st Annual International ACM SIGIR Conference, 8 pages, Jul. 2008. (Year: 2008).*

(Continued)

*Primary Examiner* — Marshall L Werner
(74) *Attorney, Agent, or Firm* — PENILLA IP, APC

(57) ABSTRACT

An autonomous personal companion utilizing a method of object identification that relies on a hierarchy of object classifiers for categorizing one or more objects in a scene. The classifier hierarchy is composed of a set of root classifiers trained to recognize objects based on separate generic classes. Each root acts as the parent of a tree of child nodes, where each child node contains a more specific variant of its parent object classifier. The method covers walking the tree in order to classify an object based on more and more specific object features. The system is further comprised of an algorithm designed to minimize the number of object comparisons while allowing the system to concurrently categorize multiple objects in a scene.

20 Claims, 20 Drawing Sheets

(56) References Cited

OTHER PUBLICATIONS

Bastie, Joel, Notification of Transmittal of the International Search Report and the Written Opinion of the International Searching Authority, or the Declaration, dated Feb. 6, 2019, 19 pages.
Atul Laxman Katole et al. "Hierarchical Deep Learning Architecture For 10K Objects Classification" _Samsung R&D Institute India-Bangalore, Bagmane Constellation Business Park, Doddanekundi Circle, Bangalore, India, 16 pages.
Jia Deng et al. "ImageNet: A Large-Scale Hierarchical Image Database" _Dept. of Computer Science, Princeton University, USA_ 978-1-4244-3991-1/09/$25.00 © 2009 IEEE, 8 pages.
Alon Zweig et al. "Exploiting Object Hierarchy: Combining Models from Different Category Levels" _School of Computer Science and Engineering Hebrew university of Jerusalem, Israel 91904_978-1-4244-1631-8/07/$25.00 © 2007 IEEE, 8 pages.
Marcin Marszalek et al. "Semantic Hierarchies for Visual Object Recognition" _INRIA, LEAR—LJK, 665 av de l'Europe, 38330 Montbonnot, France_1-4244-1180-7/07/$25.00 © 2007 IEEE, 7 pages.
Rabasa Garcia, Carmen_Invitation To Pay Additional Fees and, Where Applicable, Protest Fee_PCT/ISA/206, Annex to Form PCT/ISA/206 Communication Relating to the Results of the Partial International Search_PCT/US2018/050969, dated Dec. 13, 2018, 14 pages.

\* cited by examiner

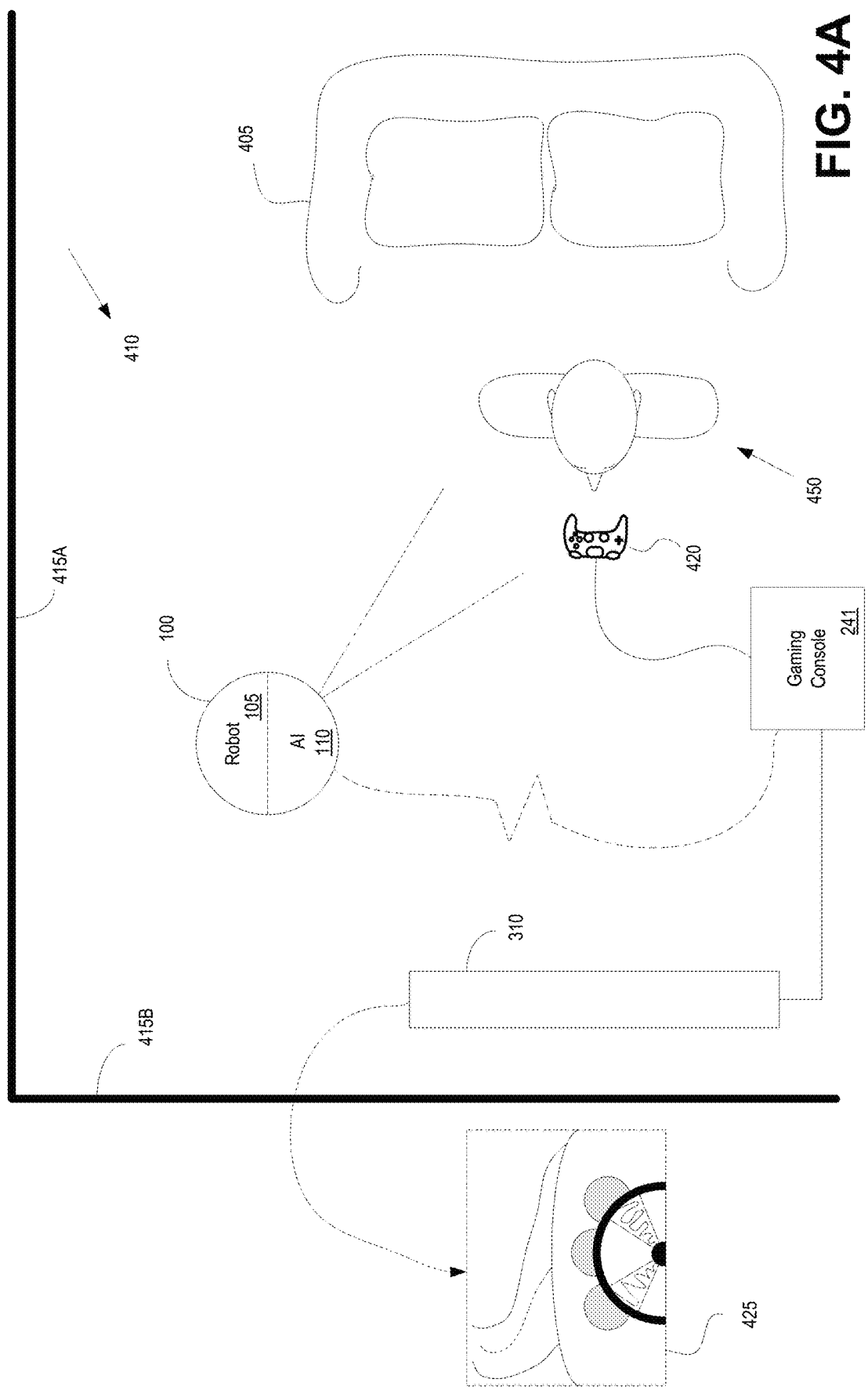

MODULAR HIERARCHICAL VISION SYSTEM OF AN AUTONOMOUS PERSONAL COMPANION

TECHNICAL FIELD

The present disclosure is related to intelligent robots, and more specifically to an automated companion personalized to a user that is implemented within an autonomous robot, and is also related to the building and implementation of the companion through artificial intelligence.

BACKGROUND OF THE DISCLOSURE

Robots are here. They are ready to interact with their human owners for a variety of reasons. These robots continue in a long line of robotic assistants, including robotic pets that were designed to provide companionship to their owners. Despite their limited processing power and restricted form factors, these early robotic pets could still move around somewhat autonomously, sense the immediate environment, have programmable intelligence for performing tasks, and interact (e.g., speak, bark, touch, etc.) with their human owners. These early robotic pets featured computer capabilities, vision sensor system, and articulators to facilitate one or more features, such as intelligence, object sensing, personality, and movement. For example, these robotic pets could interact with objects (e.g., ball), communicate with its owners, interact with its environment, play with its owners, travel about, etc. Also, these robotic pets could be programmed to participate in robot soccer leagues. Moreover, these robotic pets could grow and mature as the owners raised them through interaction. Also, these robotic pets could form personalities based on how they were raised.

These early robots are ready to reach the next level of capabilities to include, in part, increased intelligence, awareness, assistance, interaction, personality, and movement.

It is in this context that embodiments of the disclosure arise.

SUMMARY

Embodiments of the present disclosure relate to systems and methods for an autonomous personal companion implemented as an artificial intelligence (AI). In accordance with one embodiment of the present disclosure, the AI makes use of a model trained via a deep learning engine on information that has been identified as contextually relevant to a user with the goal of providing personalized assistance to the user. In one embodiment, the trained model acts a behavior selection strategy for the AI. The AI can be configured to be aware of and exchange data with other digital assets (e.g., phone contacts, calendar, phone, home automation, gaming console, etc.) operating under different proprietary operating systems. The AI can be integrated into a mobile platform and configured to move autonomously to position itself to best receive data, collect data, sense the environment, and deliver data. The AI can interact with a back-end server for processing, wherein the AI can process requests at a local level, or pre-process requests at a local level and then fully process those requests at the back-end server. In addition, embodiments are related to a modular hierarchical vision system used for object identification. For instance, the AI can utilize a method of object identification that relies on a hierarchy of object classifiers for categorizing objects in a scene. The classifier hierarchy includes root or generic classifiers trained to recognize objects based on separate generic classes. A generic classifier acts as a parent node of a tree of classifiers specific to the generic classifier, wherein nodes in the tree contains more and more specific variants (or object classes) of the generic class. The tree is walked to classify an object based on matching more and more specific classifiers.

In one embodiment, a method for object identification performed by an autonomous personal companion is described. The method includes identifying an object in an image of a scene. The method includes selecting a first generic classifier from a group of generic classifiers defining broad categories of objects using object data determined for the object, the first generic classifier selected as being representative of the object, each generic classifier forming part of a corresponding hierarchical tree of classifiers with the generic classifier as a parent node of the tree. The method includes walking a first tree of classifiers of the first generic classifier by matching classifiers at one or more levels in the first tree to the object data until reaching a classifier at a deepest level to identify an object class for the object.

In another embodiment, a non-transitory computer-readable medium storing a computer program for implementing a method is described. The computer-readable medium includes program instructions for identifying an object in an image of a scene. The computer-readable medium includes program instructions for selecting a first generic classifier from a group of generic classifiers defining broad categories of objects using object data determined for the object, the first generic classifier selected as being representative of the object, each generic classifier forming part of a corresponding hierarchical tree of classifiers with the generic classifier as a parent node of the tree. The computer-readable medium includes program instructions for walking a first tree of classifiers of the first generic classifier by matching classifiers at one or more levels in the first tree to the object data until reaching a classifier at a deepest level to identify an object class for the object.

In still another embodiment, a computer system is disclosed, wherein the computer system includes a processor and memory coupled to the processor and having stored therein instructions that, if executed by the computer system, cause the computer system to execute a method for identifying objects performed by an autonomous personal companion. The method as executed by the computer system includes identifying an object in an image of a scene. The method includes selecting a first generic classifier from a group of generic classifiers defining broad categories of objects using object data determined for the object, the first generic classifier selected as being representative of the object, each generic classifier forming part of a corresponding hierarchical tree of classifiers with the generic classifier as a parent node of the tree. The method includes walking a first tree of classifiers of the first generic classifier by matching classifiers at one or more levels in the first tree to the object data until reaching a classifier at a deepest level to identify an object class for the object.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 4A illustrates an autonomous personal companion supporting the game play of a user playing a gaming application, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods implementing deep learning (also referred to as machine learning) techniques to build an AI model personalized to a user. As such, the personal companion is implemented as an AI, wherein the AI makes use of a model trained via a deep learning engine on information that has been identified as contextually relevant to a user with the goal of providing personalized assistance to the user. The trained model can act as a behavior selection strategy for the AI. The AI model is implemented through an autonomous personal companion that is mobile. The AI can be configured to be aware of and exchange data with other digital assets operating under different proprietary platforms. The AI can be integrated within the mobile platform to move autonomously through an environment to best receive data, collect data, sense the environment, deliver data, to best sense and/or map the environment; as well as other features. In some implementations, the autonomous personal companion is configurable to interact with a back-end server for processing, wherein the AI can process requests at the local level, or pre-process requests at the local level, and then fully process those requests at the back-end server.

Furthermore, various embodiments of the present disclosure provide for a modular hierarchical vision system, wherein data is captured of a scene for purposes of object identification. A classifier hierarchy is composed of a set of root classifiers trained to recognize objects based on separate generic classes. Each root classifier acts as the parent node of a tree of child nodes, where each child node contains a more specific variant of its parent object classifier represented by the root classifier. A method for object identification covers walking the tree of child nodes in order to classify an object based on more and more specific object features. The system is further comprised of an algorithm designed to minimize the number of object comparisons while allowing the system to concurrently categorize multiple objects in a scene.

With the above general understanding of the various embodiments, example details of the embodiments will now be described with reference to the various drawings.

Figure 1A:
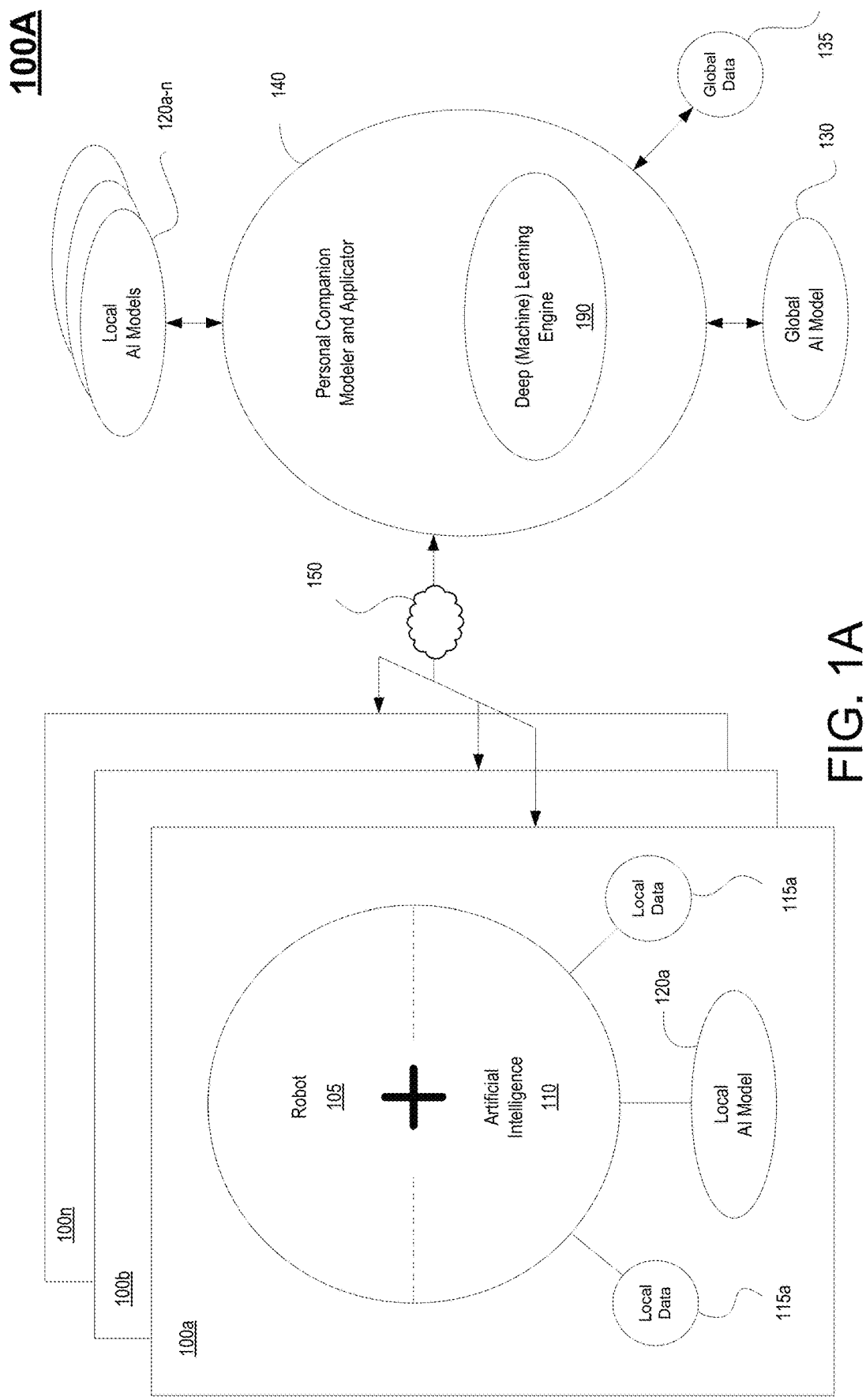
FIG. 1A is an illustration of an autonomous personal companion control implemented through an artificial intelligence (AI), in accordance with one embodiment of the present disclosure.

FIG. 1A illustrates a system 100A used for building and implementing autonomous personal companions that are implemented through corresponding AI models, in accordance with embodiments of the present disclosure. In particular, an autonomous personal companion 100 is configured to interface with a corresponding user as a digital companion, for example to provide services to the user. In addition, the autonomous personal companion 100 may be supported by a back-end server (e.g., personal companion modeler and applicator 140) through a network 150 (e.g., internet), wherein the back-end server provides artificial intelligence and/or deep, machine learning (e.g., through the deep, machine, learning engine 190) for building and applying personalized AI models, each of which correspond to its respective user. For example, one or more companions 100a-100n is configured to support multiple users in one or more locations throughout the world.

Each autonomous personal companion 100 is configured to provide multiple capabilities that provide services for (e.g., support) its respective user. In general, the companion 100 may provide its services at the request of the user, or may autonomously provide services or offer services to the user at appropriate times (e.g., sensing a need by the user, or determining contextually relevant actions, random generation, etc.). For example, the autonomous personal companion 100 may be configured to provide digital assistance to the user, such as processing user search requests that perform various operations (e.g., search for information, purchase goods and/or services, etc.); autonomously generate search requests relevant to the user; autonomously generate actions that are contextually relevant to the user (e.g., purchasing potato chips through an electronic commerce vendor after noticing that the pantry is bare and a party was held the previous night); provide gaming assistance to the user playing a gaming application (e.g., providing tips and aids that are helpful in navigating through a corresponding gaming application); extend the displayed gaming space of a gaming application by integrating the three dimensional (3D) gaming space within the physical world, as well as other features.

In addition, the autonomous personal companion 100 may provide companionship to the user, such as hold a conversation with the user, provide digital assistance to the user, build a relationship with the user through conversations, and accompany the user throughout a period of time or multiple periods of time. The companion 100 may prompt the user to respond, much like a human or animal companion would. For example, the companion 100 may suggest beginning a game of cards to be played between the companion 100 and user, or may suggest watching digital content on a display (e.g., fixed display remote from or a display integrated with the companion 100), or may bring over a game controller to prompt the user to playing a gaming application.

At least some of the actions performed by the autonomous personal companion 100 are contextually relevant to the user. That is, because the companion 100 is contextually aware of the environment that the user is currently engaged in and is able to build and/or access an AI model that is personal to the user, the actions generated by the companion 100 can be tailored to a context within which the user is experiencing. For example, when the user makes a seemingly generic request (e.g., "What was the score last night?"), based on the AI model for the user and the current date, the companion 100 would determine the current context for that request and provide the appropriate and relevant response: "Warriors win 101-97." The response is contextually relevant, because the AI model defines the user as a fan of the Warriors, and wherein the user only keeps up with the Golden State Warrior games in the National Basketball Association. Further, the response is contextually relevant to the user because the AI model also defines the user as an NBA fan in the month of April during playoffs, and one who is not concerned with any scores from other sports. Because the current date is one in April, the score for the Warriors from the night before can be searched through the internet by the companion 100.

As shown in FIG. 1A, numerous personal companions 100a-100n are configured to interface with corresponding users as their respective digital companions. For purposes of brevity and clarity, companion 100a is described, and the description is representative of the features provided in companions 100a-100n. In particular, each companion is implemented within a robot 105 that is mobile, wherein the robot may take on any suitable form factor. Each companion is supported through artificial intelligence 110 that may be distributed both locally in the robot 105 and at the back-end server 140. In one embodiment, AI 110 is configured as a portion of a local AI model 120a used for providing, in part, services to a corresponding user. This information that is learned using AI 110 may or may not be shared with the back-end server 140 that may also be tasked with building the local AI 120a depending on the type of information that is collected and/or learned. For example, sensitive information may be processed locally to build the local AI model 120a, but may not be shared with the back-end server 140.

In addition, the AI 110 of companion 100a includes a version of the local AI model 120a, wherein model 120a is personal to the corresponding user, and wherein AI 110 is configured for implementing the AI model 120a. In particular, the term "local AI model" is used to indicate that the AI model corresponds to a particular or localized user. The local AI model 120a stored within the form factor of robot 105 may be a full version of the AI model, or may be a base model that autonomously provides some subset of the capabilities available with the full version of the AI model. The full version of the AI model is also stored and accessible by the back-end server 140 providing AI modeling and application. As such, companion 100a may function independent of the back-end server 140, and provide either a full set of capabilities (if the full version of the local AI model is stored at robot 105), or a limited set of capabilities (if a lesser version of the local AI models is stored at robot 105). On the other hand, companion 100a may function in cooperation with the back-end server 140, and provide the full set of capabilities provided by the local AI model 120a. For example, the local AI model 120a at the robot 105 works cooperatively (e.g., may pre-process data) with the local AI model 120a at the back-end server 140 which is better configured (faster and more resources) to perform most of the AI processing.

As shown in FIG. 1A, local data 115a is collected by companion 100a, such as by robot 105. The local data 115a may be used by the AI 110 at the robot 105 to help build the local AI model 120a, using whatever AI capabilities are stored at robot 105. In addition, the local data 115a may be delivered to the personal companion modeler and applicator at the back-end server 140 to build the local AI model 120a, using the AI capabilities of the machine learning engine 190 (e.g., implementing a nearest neighbor based tagging and scenario selection algorithm). As shown, one or more local AI models 120a-n are generated and stored at the back-end server 140 for supporting one or more users.

Because the local data 115 for each of the companions 100a-100n is delivered to the personal companion modeler and applicator at the back-end server, each of the local data may be aggregated to generate a global AI model 130. The aggregated local data may be stored as global data 135.

Figure 1B:
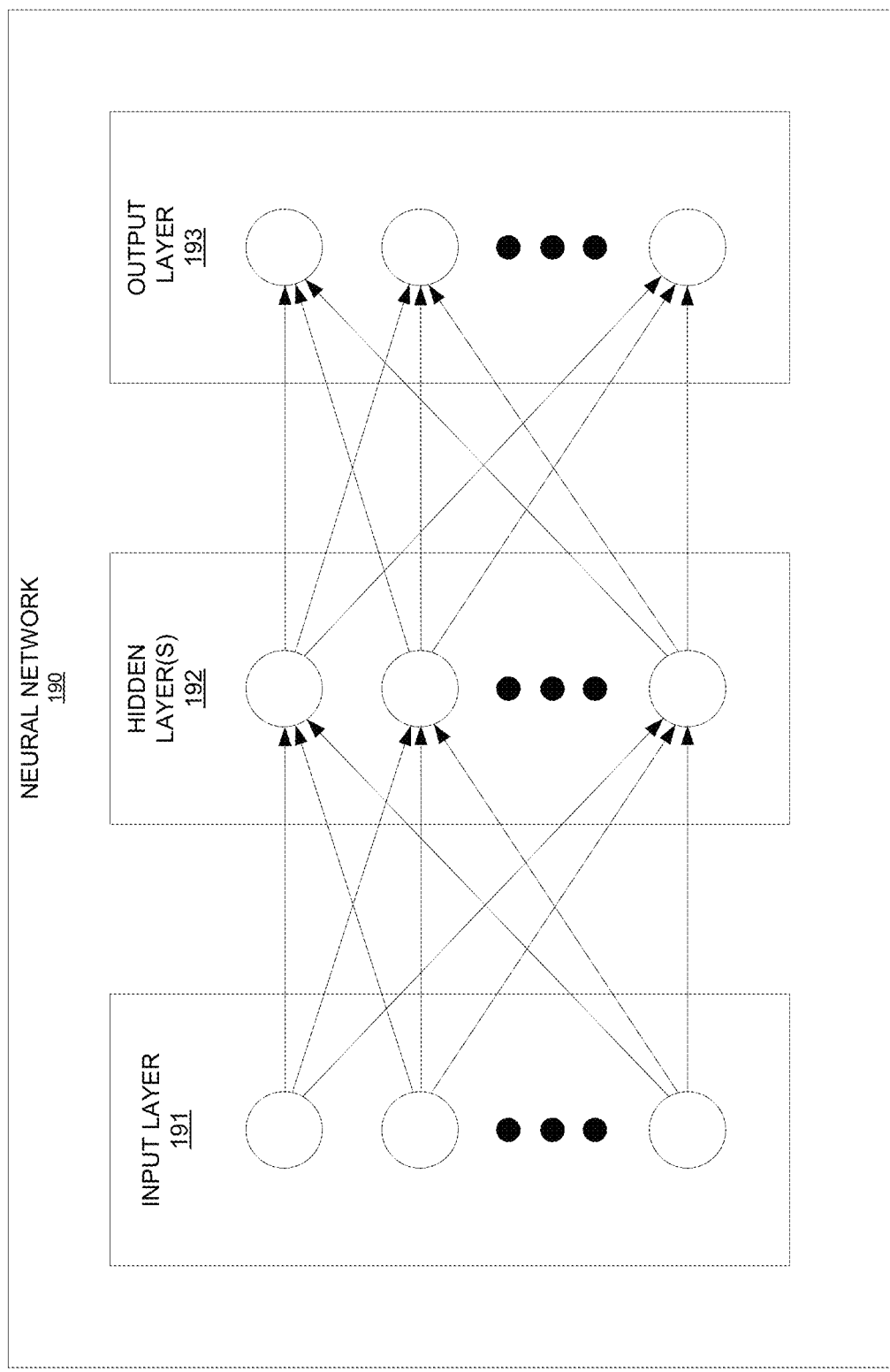
FIG. 1B illustrates an example neural network used to build an AI, wherein the AI is used to implement an autonomous personal companion for a user, in accordance with one embodiment of the present disclosure.

FIG. 1B illustrates an example neural network used to build a local AI model for a corresponding user through training implemented by neural network based learning engine 190 of the personal companion modeler and applicator 140, in accordance with one embodiment of the present disclosure. In one embodiment, deep learning engine 190 may be implemented to perform tag identification to classify user behavior. In particular, the modeler and applicator 140 in system 100A of FIG. 1A is configured to identify user behavior patterns and tag those patterns that may be useful and suitable for when the autonomous personal companion 100 provides services to the user. In addition, the neural network may be implemented within the AI 110 of companion 100, in one embodiment. The resulting local AI model 120 for the user defines, in part, the behaviors, biometrics, actions, emotions, expectations, desires, likes, wants, needs, and the environment (for providing context) of and relevant to the user. The personal companion modeler and applicator 140 may be any computing device, in particular, including a back-end server computing device that is coupled to each of the autonomous personal companions 101a-101n directly or through a network (e.g., local network, internet, etc.).

Specifically, machine learning engine 190 in the modeler 140 is configured to analyze local data 115 pertinent to the user, wherein the local data 115 is collected, in part, by the autonomous personal companion 100. The local data 115 is collected in association with monitoring the user (e.g., controller inputs, requests, actions, behaviors, responses, etc.), as well as the environment of the user. As will be described below, the companion 100 is configured with various features (e.g., camera, active actuators, passive sensors, controllers, mouse, scanners, etc.) that monitor and/or make request for purposes of collecting data. Basically, any relevant information associated with the user may be collected and used, in part, to define the user, and to understand the context within which the user is present, and to predict how the user feels, will act or respond to various conditions and/or stimuli. As such, the deep learning engine 190 is able to classify information about the user so that a corresponding local AI model 120 can provide the best services for the user, and wherein the services are provided with minimal input by the user. For example, the AI model 120 can be used (e.g., through implementation of the deep learning engine 190) to understand requests made by the user, to predict what the user will need or may want, and provide services that satisfy those requests and predictions.

In another embodiment, in addition to the local data 115, other data (e.g., global data 135) may be optionally utilized and/or collected by the plurality of personal companions 100a-n and also used in building the local AI model 120 for the corresponding user. Basically, the global data 135 is the aggregation of all the local data 115 collected for all the users. In particular, some data may be generic and suitable for use when building all AI models for all users, or at least some subset (of various sizes) of users. In addition, the global data 135 may be used to build a global AI model 130, that may be used generally for any user. Further, the global data 135 may be used to build various global AI models, each of which are targeted to a particular grouping of users (e.g., grouped through demographics, region, music tastes, schooling, etc.).

As such, the local data 115 and some portion of global data 135 are fed to the machine learning based engine 190. This engine 190 utilizes artificial intelligence, including supervised learning algorithms, reinforcement learning, or other artificial intelligence-based algorithms to build the local AI model 120 for the corresponding user.

In that manner, during the learning and/or modeling phase, the data is used by the deep learning engine 190 to predict the reactions, actions, wants, and/or needs for a given user given a set of input data. These reactions, actions, wants and/or needs may be generally classified as user behavior, and as such, the AI model 120 can be used to generally identify and/or classify behavior of a corresponding user given some input data, and provide an appropriate response for the AI (e.g., determine outward behavior of the AI as implemented through the personal companion). For example, the input data may be a specific request by the user, wherein the AI model 120 is used to generate a response, and wherein the response is related to services provided by the autonomous personal companion 100. In addition, the input data may be a collection of environmental data that irrespective of any directed user input or request may be used to predict the reactions, actions, wants and/or needs of the user to which the response is directed. For example, the AI model 120 may be used to predict what services the user may want and/or need without the user having to explicitly deliver a request.

Over time, the AI model 120 can identify and/or classify user behavior and apply the AI model to predict the behavior, actions, responses, wants and/or needs of a user in response to an approximate set of input data. For instance, tag identification and scenario selection may be used to identify and classify user behavior as tags, and provide an AI response that predicts the wants and/or needs of the user and provides services responsive to those wants and/or needs. For example, in the previously introduced example, a user is interested only in NBA scores in the month of April, and as such, any request for a sporting score of a game is used to predict the wants and needs of the user to include understanding that the user is a Golden State Warriors fan, and that in the month of April that user is only interested in scores from games played by the Warriors, all of which leads to a response (e.g., as implemented through the AI model 120) with the score for the latest game played by the Warriors. Other examples are useful in describing the building of the AI model 120. For example, the AI model 120 can be used to define certain biometrics of the user. In one case, the gait of the user can be defined, such that the personal companion can sense and track the footfall of an approaching person, and determine that it is the corresponding user associated with the AI model 120. The AI model 120 can be used to determine that at 5:00 pm, the user typically returns home, and sits down to watch digital content. As such, the personal companion 100 may upload content that is of interest to the user lately (e.g., binge watching a medical drama show) to a display already playing, or ready for play at the request of the user to the companion 100.

The neural network 190 represents an example of an automated analysis tool for analyzing data sets to determine the responses, actions, behavior, wants and/or needs of a corresponding user. Different types of neural networks 190 are possible. In an example, the neural network 190 supports deep learning that may be implemented by deep learning engine 190. Accordingly, a deep neural network, a convolutional deep neural network, and/or a recurrent neural network using supervised or unsupervised training can be implemented. In another example, the neural network 190 includes a deep learning network that supports reinforcement learning. For instance, the neural network 190 is set up as a Markov decision process (MDP) that supports a reinforcement learning algorithm.

Generally, the neural network 190 represents a network of interconnected nodes, such as an artificial neural network. Each node learns some information from data. Knowledge can be exchanged between the nodes through the interconnections. Input to the neural network 190 activates a set of nodes. In turn, this set of nodes activates other nodes, thereby propagating knowledge about the input. This activation process is repeated across other nodes until an output is provided.

As illustrated, the neural network 190 includes a hierarchy of nodes. At the lowest hierarchy level, an input layer 191 exists. The input layer 191 includes a set of input nodes. For example, each of these input nodes is mapped to local data 115 collected actively through actuators or passively by sensors during monitoring and/or querying of the user and the environment associated with the user by the autonomous personal companion 100.

At the highest hierarchical level, an output layer 193 exists. The output layer 193 includes a set of output nodes. An output node represents a decision (e.g., prediction) that relates to one or more components of a local AI model 120, for example. As previously described, the output nodes may identify the predicted or expected responses, actions, behaviors, wants and/or needs of the user for a given set of inputs, wherein the input may define various scenarios (e.g., direct requests, time of day, various patterns of behavior, etc.). These results can be compared to predetermined and true results obtained from previous interactions and monitoring of the user and/or environment in order to refine and/or modify the parameters used by the deep learning engine 190 to iteratively determine the appropriate predicted or expected responses, actions, behaviors, wants and/or needs of the user for a given set of inputs. That is, the nodes in the neural network 190 learn the parameters of the AI model 120 that can be used to make such decisions when refining the parameters.

In particular, a hidden layer 192 exists between the input layer 191 and the output layer 193. The hidden layer 192 includes "N" number of hidden layers, where "N" is an integer greater than or equal to one. In turn, each of the hidden layers also includes a set of hidden nodes. The input nodes are interconnected to the hidden nodes. Likewise, the hidden nodes are interconnected to the output nodes, such that the input nodes are not directly interconnected to the output nodes. If multiple hidden layers exist, the input nodes are interconnected to the hidden nodes of the lowest hidden layer. In turn, these hidden nodes are interconnected to the hidden nodes of the next hidden layer, and so on and so forth. The hidden nodes of the next highest hidden layer are interconnected to the output nodes. An interconnection connects two nodes. The interconnection has a numerical weight that can be learned, rendering the neural network 190 adaptive to inputs and capable of learning.

Generally, the hidden layer 192 allows knowledge about the input nodes to be shared among all the tasks corresponding to the output nodes. To do so, a transformation $f$ is applied to the input nodes through the hidden layer 192, in one implementation. In an example, the transformation $f$ is non-linear. Different non-linear transformations $f$ are available including, for instance, a linear rectifier function $f(x)=\max(0,x)$.

The neural network 190 also uses a cost function c to find an optimal solution. The cost function measures the deviation between the prediction that is output by the neural network 190 defined as f(x), for a given input x and the ground truth or target value y (e.g., the expected result). The optimal solution represents a situation where no solution has a cost lower than the cost of the optimal solution. An example of a cost function is the mean squared error between the prediction and the ground truth, for data where such ground truth labels are available. During the learning process, the neural network 190 can use back-propagation algorithms to employ different optimization methods to learn model parameters (e.g., the weights for the interconnections between nodes in the hidden layers 192) that minimize the cost function. An example of such an optimization method is stochastic gradient descent.

In an example, the training dataset for the neural network 190 can be from a same data domain. For instance, the neural network 190 is trained for learning the predicted or expected responses, actions, behaviors, wants and/or needs of the user for a given set of inputs or input data. In this illustration, the data domain includes session data collected for interactions of the user with baseline input data. In another example, the training dataset is from different data domains to include input data other than baseline.

As such, the neural network 190 may identify expected responses, actions, behaviors, wants and/or needs of the user for a given set of inputs. Based on these predictive results, the neural network 190 may also define an AI model 120 that is used to provide contextually aware (e.g., of the environment and user) services for the corresponding user.

Figure 2:
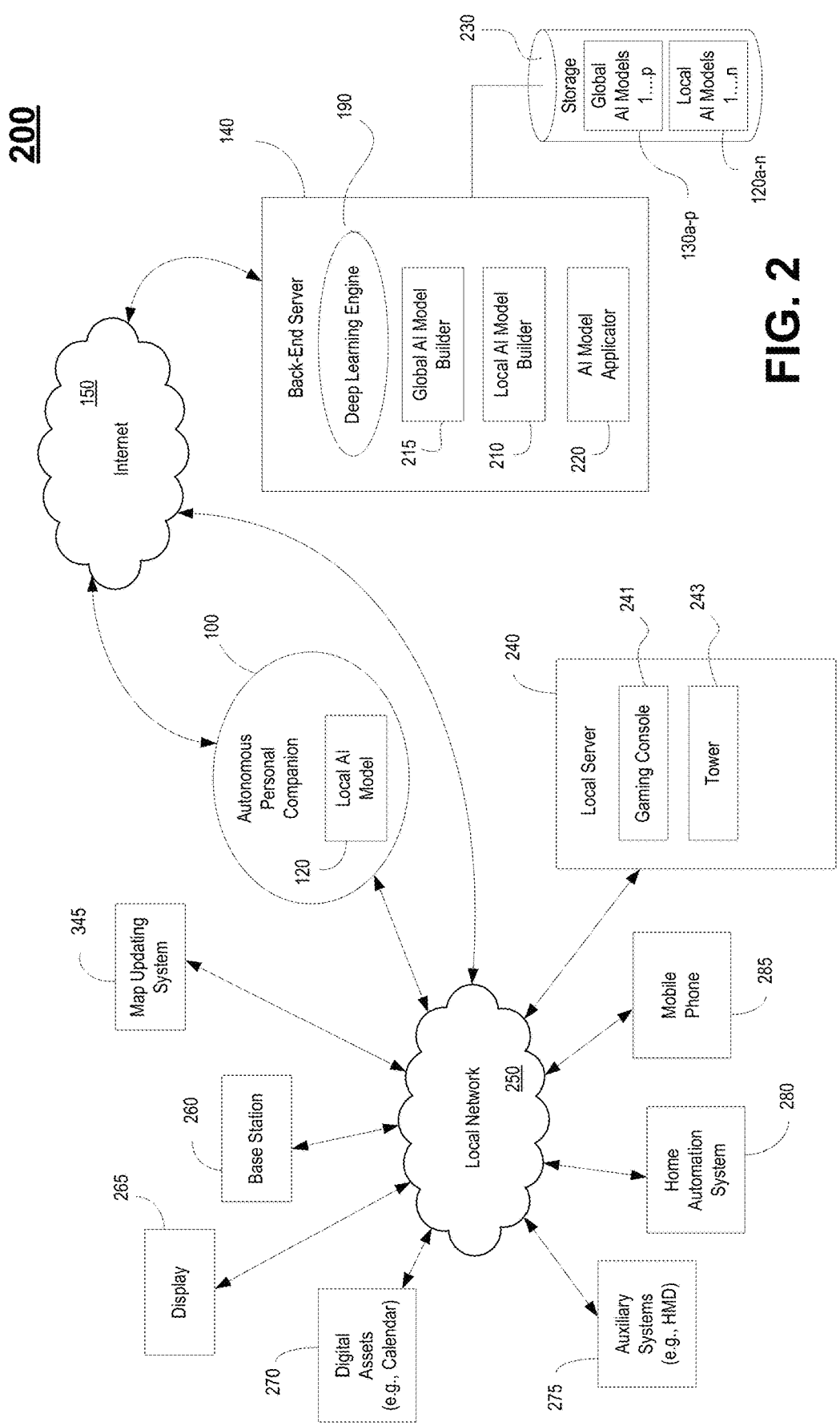
FIG. 2 illustrates a system supporting an autonomous personal companion control implemented through an AI, in accordance with one embodiment of the present disclosure.

FIG. 2 illustrates a system 200 supporting an autonomous personal companion 100 implemented through a local AI model 120 of a corresponding user, in accordance with one embodiment of the present disclosure. The personal companion 100 is configured to provide services to the user based on the local AI model 120 which is capable of predicting among others the responses, actions, behaviors, wants and/or needs of the user through identification of patterns of user behavior that when classified into tags may be used to select a scenario, and provide an AI response considering the scenario that predicts the wants and/or needs of the user and provides services responsive to those wants and/or needs.

As previously described, the personal companion 100 may work independently of or in conjunction with a back-end server 140 that performs modeling of the local AI model 120, and application of the local AI model. In particular, the back-end server 140 includes the deep learning engine 190, previously described, that is configured for learning and/or modeling, in part, the responses, actions, behaviors, wants and/or needs of the user for any given set of inputs (e.g., that define a given scenario driven by or experienced by the user) in order to build and apply a local AI model 120 that supports and provide services to the corresponding user. In particular, the local AI model builder 210 is configured to interface with the neural network based engine to build the one or more local AI models 120a-n that are stored in storage 230. In addition, the global AI model builder 215 is configured to interface with the deep learning engine to build the one or more global AI models 130a-p, previously described, and also stored in storage 230. For example, the AI model builders 210 and 215 may operate to set the parameters defined within the deep learning engine 190 that define the various nodes in the input layer 191, hidden layers 192, and output layer 193, for purposes applying the corresponding AI models within the deep learning engine 190.

The autonomous personal companion 100 may implement the local AI model 120 both within its form factor (e.g., autonomous robot shell) and through the back-end server 140, or a combination thereof. As previously described, companion 100 may implement the local AI model 120 independent of the back-end server, such as when performing less complex AI operations (e.g., a request to turn on the room lights), or when there is limited or no network connectivity. In addition, the companion 100 may implement the local AI model 120 in cooperation with the back-end server. For example, the companion 100 may perform preliminary operations through the local AI model 120 that is localized in order to structure or condition the input parameters (e.g., defining the operations to be performed) so that they are easily delivered (e.g., reduced and/or compressed) to the back-end server 140, wherein most of the artificial intelligence within the AI model 120 is performed by the AI model applicator 220 and/or the deep learning engine 190.

As shown in FIG. 2, the autonomous personal companion 100 is located within the same environment of the user, so that it may provide services to the user. The companion 100 is able to interface with one or more digital or physical objects and/or entities either directly through wired or wireless connections (not shown) or through the local network 250, wherein the network 250 may include wired or wireless connections. FIG. 2 shows the interfacing of companion 100 with various digital and/or physical objects. Additional interfacing with other digital and/or physical objects is contemplated. As shown, companion 100 may interface with the objects in the local environment directly (e.g., wired or wireless peer-to-peer communication) or through a local network 250 (e.g., Bluetooth, Wi-Fi, local area network, etc.) via wired or wireless connections. In addition, local network 250 is communicatively coupled with the wide area network or internet 150 to facilitate communication of the various digital and physical objects communicating through local network 250 to other remote objects (e.g., back-end server 140, other servers, etc.)

For example, the companion 100 may interface with base station 260, such as moving one or both of the base station 260 and the companion 100 to the same or approximately the same location for purposes of recharging the companion 100, or communicating with the base station to receive software updates, as well as other exemplary use cases.

In addition, the companion 100 may interface with a local server 240, wherein the server 240 may include a gaming console 241, tower computer 243, etc. For example, the gaming console 241 may provide a main stream of data to display 265, and may also provide summaries or the complete version of the main stream to the companion 100, so that companion 100 may access helpful information (e.g., gaming assistance) that can be displayed (e.g., through a display of companion 100) or delivered (e.g., audio) to the user simultaneous with the game play of the user. The tower 243 may provide additional features that the companion 100 may control or take advantage of, such as search operations, file storage, etc.

In one embodiment, companion 100 may interface and/or implement a map updating system 345, which may be located within or remote from companion 100. The map updating system 345 is configured to continually map the environment within which the companion 100 is located. For example, the updating may occur as a background process to other applications executing on companion 100. In that manner, as objects move around the environment or are newly introduced into the environment, the map updating system 345 is able to recognize that movement and/or introduction to continually update the mapping of objects and structures within the environment. As such, based in part on the updated mapping, the companion 100 is able to move about the environment without colliding with objects. Movement by companion 100 may be necessary to place the companion in the best position to provide services. For example, companion 100 may need to move closer to a wall that is used to project images, or may need to move closer to the user to better listen to the user for purposes of holding a conversation or responding to requests, etc.

As a further example, companion 100 may interface with one or more digital assets 270, for purposes of controlling operations within those assets or accessing data within those digital assets. For example, a digital asset may include a calendaring feature that is implemented within a processor or operating system, such as through local server 240, in which case, the companion 100 may be tasked to update or create an entry, or obtain imminent calendar dates, etc. on the calendaring feature.

In still another example, the companion 100 may interface with one or more auxiliary systems 275. For example, an auxiliary system 275 may include a head mounted display (HMD), such that the personal companion may receive updates from the virtual reality (VR) content being displayed through the HMD in order to provide additional content to be displayed within the HMD that is consistent with the VR content (e.g., providing information augmenting the VR—implementing augmented reality).

Also, the companion 100 can interface with a home automation system 280 that is configured to automate the functioning of the home (e.g., setting thermostats for heating and cooling, ventilation controls, window coverings, network connectivity, digital content delivery and presentation, home appliances including washers and dryers, etc.). As such, companion 100 may instruct the home automation system 280 to turn off lights in the entertainment room in order to provide the best lighting for a display concurrent with the game play of the user.

In addition, companion 100 may interface with mobile phone 285 to access and/or control various features provided by phone 285. For example, companion 100 may connect with the streaming music feature on phone 285 to broadcast music.

Figure 3A:
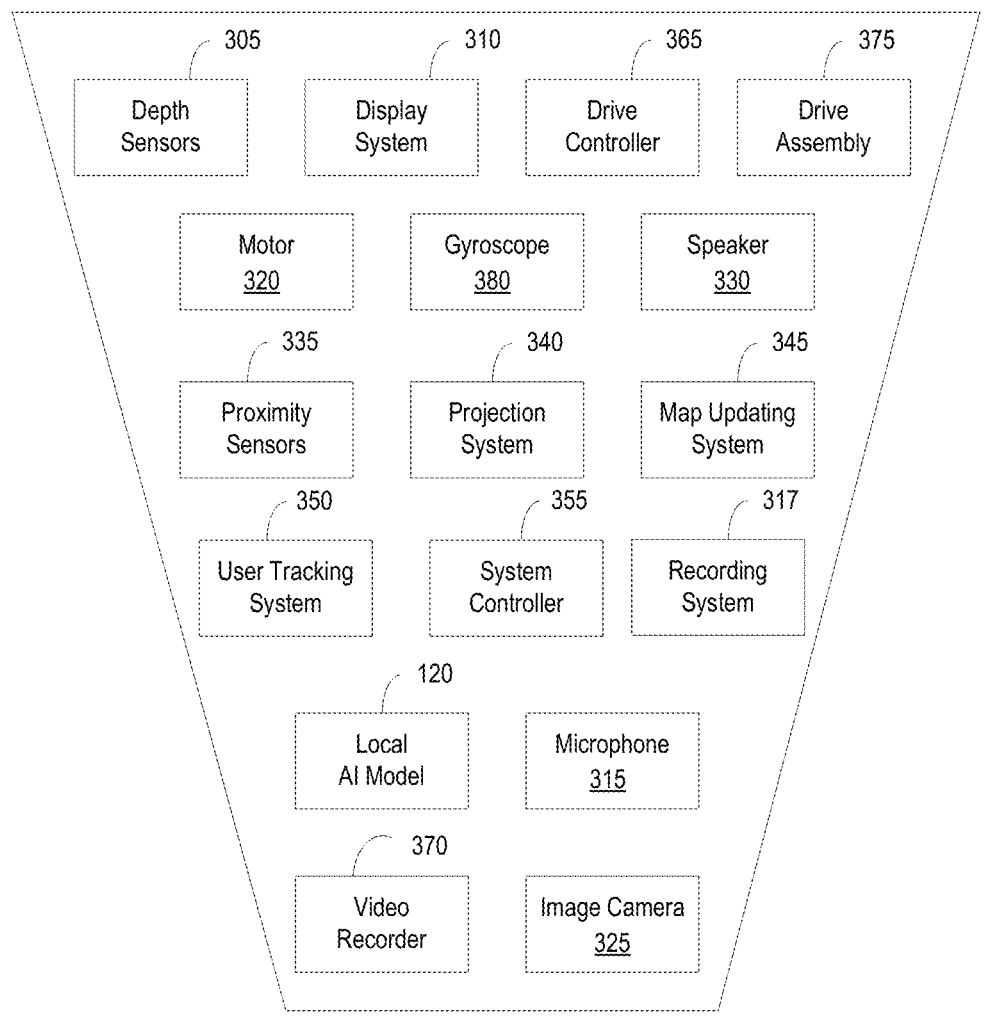
FIG. 3A is a block diagram of an autonomous personal companion that is implemented through an AI, in accordance with one embodiment of the present disclosure.

FIG. 3A is a block diagram of an autonomous personal companion 100 that is implemented through a local AI model of a user, in accordance with one embodiment of the present disclosure. As previously introduced, the companion 100 is configured to interface with a corresponding user to provide services of any type (e.g., digital, physical, etc.) through a local AI model 120. The local AI model 120 may be a distributed model that cooperates with a back-end server 140 to predict, in part, the behaviors, responses, actions, reactions, wants and/or needs of the user. Though various exemplary components of the companion 100 are shown in FIG. 3A, other functions and/or components are well supported.

As shown in FIG. 3A, companion 100 includes a system controller 355 configured to manage the overall operations. For example, controller 355 may manage the hardware and software resources available for use by the various components in order to facilitate operation of the companion 100. In addition, controller 355 may control one or more of the components (e.g., motor 320, depth sensor 305, etc.) provided within companion 100, including the interfacing and cooperation between the components.

Drive controller 365 is configured to manage the mobility functions implemented by the companion 100. The ability for motion is provided, in part by the motor assembly 320 (e.g., electric, fuel, etc.), or other means for propulsion, and the drive assembly 375 configured to impart motion to the companion 100. In some implementations, drive assembly 375 may include one or more wheels, or other means (e.g., hover capability) configured to provide movement of companion 100. In some cases, gyroscope 380 may provide stability information to the drive controller 365 in order to keep the companion 100 in the correct orientation, while in a stationary position, or while moving.

Companion 100 may include components configured for aiding navigation of the companion through a current environment. For example, depth sensors 305 and proximity sensors 335 may provide information regarding fixed and moving objects in the environment. In particular, proximity sensors 335 may be configured to determine the location of objects (e.g., by detecting surfaces) in close proximity to companion 100. Depth sensors 305 may also be configured to determine the locations of near and far objects within the environment of companion 100. That is, the sensors 305 and 335 are able to determine the depth of objects in relation to a placement of the companion 100 within the environment, and through continual updating generate a mapping of the environment that includes locations of objects (new and updated) within the environment. In addition, depth sensors 305 may be configured to determine the composition of the objects, such as determining whether an object is hard (e.g., metal desk) or soft (e.g., couch). Depth and proximity sensors may employ one of various techniques for determining the location and/or composition of objects within the environment, including the use of electromagnetic fields, induction, radio frequencies, thermal variations, infrared frequencies, air flow, etc. Further, images may be captured by camera 325 and/or video recorder 370 in order to provide object information (e.g., relational positioning of objects), as well as providing other uses and services (e.g., personal image and video capture, video gaming recording, recording of daily activities of user, etc.).

In addition, map updating system 345 may use, in part, the information provided by the depth sensors 305 and proximity sensors 335 in order to map the environment. Other information and/or data may be accessed for purposes of mapping to include architectural blueprints, images captured by camera 325, video recorder 370, etc. Mapping system 345 may be configured to provide a three dimensional (3D) view of the environment. For example, the data collected by the various components and/or third party information can be used to generate one or more types of mapping of the environment. These mapping include two-dimensional and 3D maps. Further, map updating system 345 continually maps the environment using one or more tools (e.g., depth sensors 305 and proximity sensor 335, etc.), as previously described. For example, objects that move around or are introduced into the environment are discoverable, such that locations of the objects are updated into the mapping of the environment. Other types of mappings include images and video tours of the environment. In one embodiment, the information may be used to map out the home of the user, wherein room locations can be determined, walls of the rooms can be classified (e.g., for purposes of determining which can be used as projection screens), actual and virtual images of the various rooms may be stored and provided, and video and virtual tours of the home may be generated (e.g., for purposes of insurance, real estate showings, etc.).

In another embodiment, companion 100 may include a display system 310 for purposes of entertainment, communication, etc. For example, display system 310 may be used for communicating with the user, such as when providing results of an internet search by the user, or querying the user for one or more purposes (e.g., inquiring about the general well-being of user, clarifying various requests by the user, etc.). In addition, display system 310 may be used as a primary gaming display (showing the game play of the user playing a gaming application as streamed by a primary gaming stream from a gaming console), or auxiliary display for providing secondary gaming stream (e.g., information related to the game play of the user). Display system 310 may be configured to show a movie, or other digital content. Display system 310 may work in conjunction with speaker or audio system 330 for providing audio in relation to the images or video provided by the display. For example, audio of the game play of the user may be presented in association with and synchronized with the video of the game play as presented on display.

Further, companion 100 may include a projection system 340 for purposes of entertainment, communication, etc. Projection system may provide similar functionality as display system 310 to include providing communication with the user, or displaying a primary stream from a gaming application as provided by a console or back-end streaming service, providing secondary stream of data (e.g., as an auxiliary screen to a gaming application providing secondary or supplementary information, or providing an expanded view of the gaming world in conjunction with a primary display), displaying digital content, etc. In addition, other features may be provided through the projection system 340. Because the projected images can be larger vs. a display system, expanded viewing options may be provided. For example, different types of videos and/or imaging (e.g., holographic, 3D, etc.) may be presented through the projection system 340 of companion 100.

Recording system 317 is configured to capture video and/or audio of digital information collected and/or generated by companion 100. For example, the game play (e.g., video and audio) of the user playing a gaming application may be collected and stored. Additional information may be collected by recording system 317, such as additional audio from the user as the user is playing the gaming application, and joined with the video and audio of the game play.

In addition, a user tracking system 350 may be configured to track general and specific movement of the user. General movement includes overall body movement of the user within the environment. Specific movement may be targeted to a part of the body, such as determining the movement of the head, or torso of the user. For example, tracking system may determine orientation of the various body parts of the user, and track the turning of the head or body. Tracking system 350 may collect data provided by one or more other components, including images and video from camera 325 or video recorder 370, depth sensors 305, proximity sensors 335, or other tracking sensors (e.g., integrated or third party sensors—such as provided through a gaming console), etc.

Figure 3B:
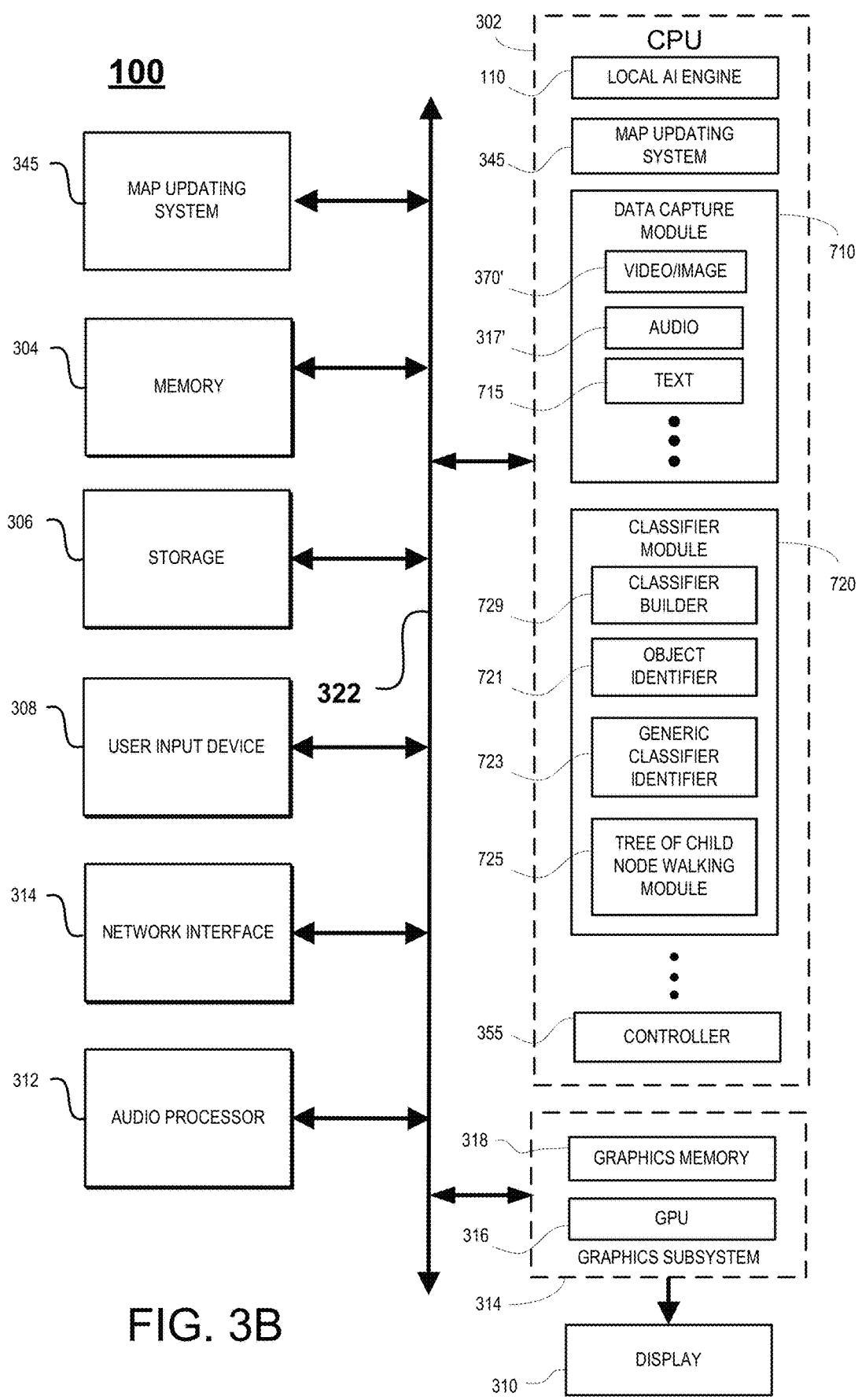
FIG. 3B illustrates components of an example device 100 that can be used to perform aspects of the various embodiments of the present disclosure.

FIG. 3B illustrates components of an example device 100 that can be used to perform aspects of the various embodiments of the present disclosure. For example, FIG. 3B illustrates an exemplary hardware system suitable for implementing a device that provides services in support of a user, wherein the device is configured to provide services as implemented through a local AI model that is capable of predicting, in part, the behaviors, actions, reactions, responses, wants and/or needs of a corresponding user, in accordance with one embodiment. This block diagram illustrates a device 100 that can incorporate or can be a personal computer, video game console, personal digital assistant, or other digital device, suitable for practicing an embodiment of the invention. Device 100 includes a central processing unit (CPU) 302 for running software applications and optionally an operating system. CPU 302 may be comprised of one or more homogeneous or heterogeneous processing cores.

In accordance with various embodiments, CPU 302 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 302 may be configured to include the localized AI engine 110 (e.g., deep learning) that is configured to support and/or perform learning operations with regards to predicting, in part, user behavior, actions, responses, reactions, wants and/or needs of the user and provide services based on that prediction. Also, AI engine 110 is configured to apply the local AI model 120 of the user at the companion 100. In addition, CPU 302 may provide additional functionality as provided by one or more of components of companion 100 as shown in FIG. 3A, such as the controller 355, drive controller, map updating system 345, etc.

CPU 302 may also provide additional functionality related to the identification of objects in a scene captured by the autonomous personal companion 100, and as implemented through a modular hierarchical data (e.g., vision) system implementing a classifier hierarchy. An object in a captured scene is identified by first matching the object to a generic classifier defining a broad object category and then walking a tree of classifier child nodes associated with the matched generic classifier. As the tree is walked, the child nodes of the generic classifier that are matched to the object input data are more specific classifiers built using more and more specific training data sets using artificial intelligence. The walking process completes when reaching the end classifier at the deepest level, wherein the end classifier has an object class which identifies the object. For example, CPU 302 includes a data capture module 710 configured for capturing various types of data (e.g., video, audio, text, etc.). For illustration, data capture module 710 may include a video and/or image capture module 370' configured for capturing video data and/or image data of a scene or environment. For instance, video/image capture module 370' may be similarly configured as video recorder 370 or image camera 325 of FIG. 3A. In addition, data capture module 710 may include an audio capture device 317' configured for capturing audio data of a scene or environment. For instance, audio capture device 317' may be similarly configured as microphone 315 or recording system 317 of FIG. 3A. Further, data capture module 710 may include a text capture device 715 that is configured for capturing textual data found within the scene and/or environment. Additional capture devices may be included within the data capture device 710 for purposes of capturing various other types of data (e.g., tactile, pressure, temperature, etc.)

CPU 302 includes a classifier module 720 configured for identifying objects in a scene. The classifier builder 729 is configured to build each of the classifiers in the classifier hierarchy. In particular, each classifier is presented with independent sets of training data. In the classifier hierarchy, classifiers near the top are trained using broader sets of training data, and classifiers deeper into the hierarchy are trained using more and more specific sets of training data. Each classifier includes a set of weights that define an internal representation of its respective object class or object category. The training process used to build classifiers is further illustrated in FIG. 8A. In addition, classifier module 720 includes an object identifier 721 for locating an object within a scene for purposes of identifying that object using the classifier hierarchy. In particular, the generic classifier identifier 723 is configured to determine within which generic class (e.g., "ball", "creature", etc.) a targeted object belongs. Once the generic class is identified, the tree of child nodes associated with the matched generic classifier is walked using the walking module 725 to determine a child node classifier at the end of the walking process, wherein the object is matched to the object class represented by that end classifier. Classifiers chosen during the walking process generate probabilities that exceed a margin or threshold indicating that the targeted object belongs to the class of the corresponding classifier. Specifically, the end classifier represents an object class that is variant of the parent class. For example, variants include a "baseball," "soccer ball," or "volleyball" within generic class of object labeled as a "round object", as defined by the corresponding root or generic classifier.

As shown, the map updating system 345 may be implemented through a hardware based device located within the companion 100. In particular, the map updating system 345 is configured to generate a mapping of the environment within which the companion 100 is located. This mapping may include a localized positioning system, such as a newly generated and/or formatted coordinate system defining the positions within space of the environment. For example, the coordinate system may incorporate values of a global positioning system (GPS), or a 3D Cartesian coordinate system, a mix of systems (e.g., floor plan defining rooms of a building interfaced with individual coordinate systems for each room), or any suitable positioning system.

Memory 304 stores applications and data for use by the CPU 302. Storage 306 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 308 communicate user inputs from one or more users to device 100, examples of which may include keyboards, mice, joysticks, touch pads, touch screens, still or video recorders/cameras, and/or microphones. Network interface 314 allows device 100 to communicate with other computer systems via an electronic communications network, and may include wired or wireless communication over local area networks and wide area networks such as the internet. An audio processor 312 is adapted to generate analog or digital audio output from instructions and/or data provided by the CPU 302, memory 304, and/or storage 306. The components of device 100, including CPU 302, memory 304, data storage 306, user input devices 308, network interface 310, and audio processor 312 are connected via one or more data buses 322

A graphics subsystem 314 is further connected with data bus 322 and the components of the device 100. The graphics subsystem 314 includes a graphics processing unit (GPU) 316 and graphics memory 318. Graphics memory 318 includes a display memory (e.g., a frame buffer) used for storing pixel data for each pixel of an output image. Graphics memory 318 can be integrated in the same device as GPU 316, connected as a separate device with GPU 316, and/or implemented within memory 304. Pixel data can be provided to graphics memory 318 directly from the CPU 302. Alternatively, CPU 302 provides the GPU 316 with data and/or instructions defining the desired output images, from which the GPU 316 generates the pixel data of one or more output images. The data and/or instructions defining the desired output images can be stored in memory 304 and/or graphics memory 318. In an embodiment, the GPU 316 includes 3D rendering capabilities for generating pixel data for output images from instructions and data defining the geometry, lighting, shading, texturing, motion, and/or camera parameters for a scene. The GPU 316 can further include one or more programmable execution units capable of executing shader programs. In one embodiment, GPU 316 may be implemented within AI engine (e.g., configured within the localized AI engine 110) to provide additional processing power, such as for the AI or deep learning functionality.

The graphics subsystem 314 periodically outputs pixel data for an image from graphics memory 318 to be displayed on display device 310, or to be projected by projection system 340. Display device 310 can be any device capable of displaying visual information in response to a signal from the device 100, including CRT, LCD, plasma, and OLED displays. Device 100 can provide the display device 310 with an analog or digital signal, for example.

It should be understood that the embodiments described herein may be executed on any type of client device. In some embodiments, the client device is a head mounted display (HMD), or projection system.

Figure 4B:
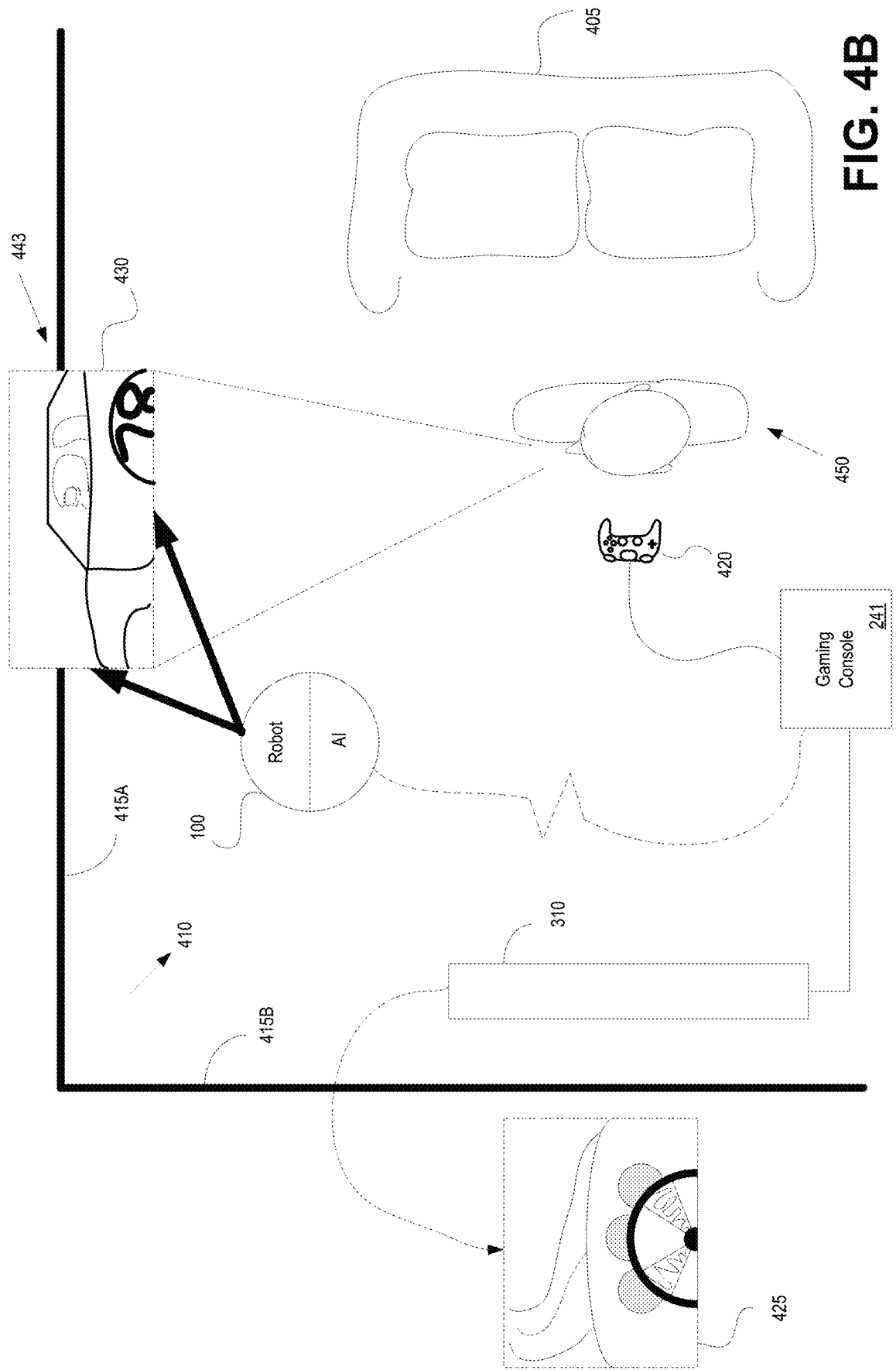
FIG. 4B illustrates the integration of a three-dimensional (3D) gaming world of the gaming application, played by the user introduced in FIG. 4A, and the physical environment of the user, wherein the autonomous personal companion is configured to project a portion of the 3D gaming world into the physical environment in response to a direction of the gaze of the user, in accordance with one embodiment of the present disclosure.
Figure 4C:
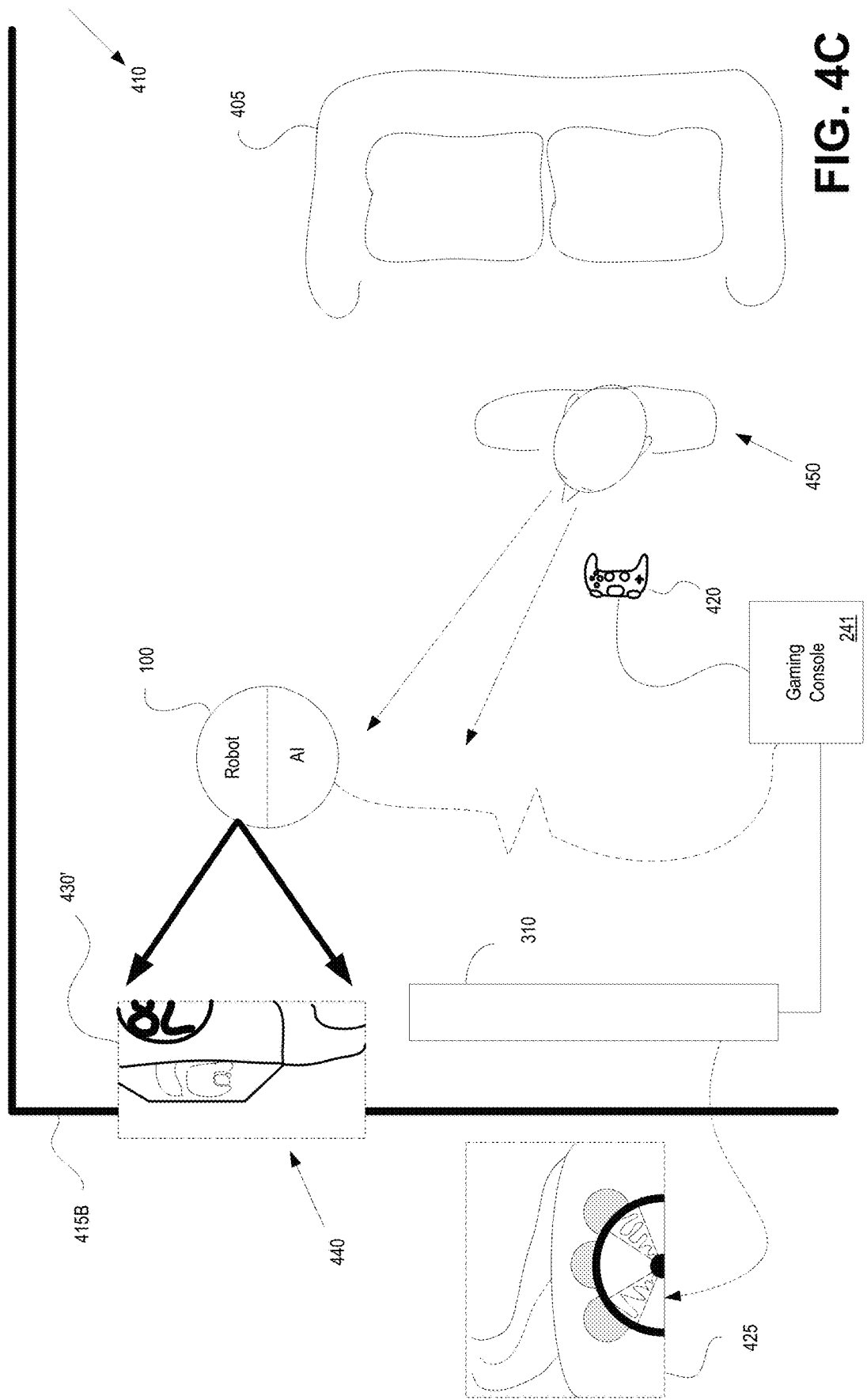
FIG. 4C illustrates another example of the integration of the 3D gaming world of the gaming application introduced in FIGS. 4A-4B, wherein an extension of the 3D gaming world of the gaming application is projected alongside a display, wherein the display shows the main view of the gaming application, wherein the extension shows a portion of the 3D gaming world, or provides supplemental information to the gaming application, in accordance with one embodiment of the present disclosure.

FIGS. 4A-4C illustrate exemplary implementations of an autonomous personal companion 100 within a home environment of a corresponding user, in accordance with one embodiment of the present disclosure. As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Though companion 100 is configured to provide a variety of services under various scenarios, FIGS. 4A-4C show a scenario where a user 450 is playing a gaming application that is executing on a gaming console 241 (or executed at a back-end server and streamed through the gaming console), and where companion 100 is capable of providing supplementary information to the game play of the user 450.

As shown, the user is located in a home environment 410, such as an entertainment room. The room includes two walls 415A and 415B. The environment 410 includes a couch 405. The user has access to a gaming console 241. In particular, the gaming application is executing and/or streaming through gaming console 241 (or any other device) in association with game play of the user 450, wherein the game play is responsive to user input, such as through controller 420. A primary stream of the game play is created, wherein video of the game play is delivered to display 310. In addition, audio of the game play may be provided through an audio system (not shown). The gaming application may be an open road racing game, wherein the user is playing a driver of a car in the race. Screen shot 425 shows an image of the video stream delivered to the display 310, and includes a view out of the front windshield and over the dash of the race car that shows the oncoming road, as well as the steering wheel and various instruments in the dash.

In addition, companion 100 is located in the environment 410, and includes a robot form factor 105 and AI 110 that is configured to implement a local AI model 120 of user 450. For example, AI 110 may be AI engine that cooperates with AI engine 190 at back-end server 140. The local AI model 120 as implemented through AI 110 is configured to provide, in part, services to user 450 related to the game play. As such, companion 100 may be communicatively coupled to gaming console 241 at least to receive information about the gaming application and/or game play. For example, the information may include the title and version of the game, the game state of the game play. In addition, companion 100 may include information provided in a secondary stream of the gaming application. For instance, gaming console 241 may generate a primary stream for presentation on display 310 and a secondary stream that is presented (e.g., via display, projection, speaker, etc.) through companion 100.

In one embodiment, companion 100 is configured to provide supplemental supporting the game play of a user, wherein the information may be related to game plays of the user and other players playing the gaming application. The information may provide general information related to the gaming application, in some implementations. The supplemental information may provide assistance to the user 450 in advancing the game play. For example, the assistance may be in the form of coaching to help the user 450 achieve a goal (e.g., pass a level), and may include visual cues showing controller inputs that generally or directly help the user achieve the goal within the gaming application. A detailed description of the supplemental information as provided through a companion application is provided in co-pending patent application entitled "GAME PLAY COMPANION APPLICATION," U.S. patent application Ser. No. 15/476,597, filed on Mar. 31, 2017, herein incorporated by reference in its entirety.

FIG. 4B illustrates the autonomous personal companion 100 interfacing with the gaming console 241 to provide supplemental information related to the game play of user 450, as introduced in FIG. 4A. For instance, FIG. 4B shows user 450 within environment 410 playing a gaming application executed on or streamed through gaming console 241. In particular, FIG. 4B illustrates the integration of a three-dimensional (3D) gaming world of the gaming application, and the physical environment of the user. As shown, companion 100 is configured to project a portion of the 3D gaming world of the gaming application into the physical environment 410. For instance, companion 100 is able to extend the view of the 3D world beyond what is presented on display 310, which continues to show screen shot 425. In particular, companion 100 projects a video stream (including screen shot 430) as a secondary stream of the gaming application, simultaneous with the primary video stream presented on display 310 (and including screen shot 425).

In addition, the projection provided by companion 100 may be made in response to a direction of the gaze of the user 450, in accordance with one embodiment of the present disclosure. For instance, a gaze tracking system of companion 100 or working in conjunction with companion 100 is configured to capture the direction of the gaze of user 450 during the game play. As an illustration, as the user is racing, a sound may be directionally provided within environment 410, which may trigger head movement. As shown, the head of user 450 is turned dramatically to the right. Other triggers are supported, such as an arrow pointing to the right side, as displayed within the primary stream on display 310. For example, a sound locator and projection system in companion 100 may produce a sound that originates, or is made to originate from a location in environment 410 that also corresponds to a point of origin within the gaming world of the gaming application. The sound may be from the engine of a competitor that is trying to pass the driver controlled by user 450, and may originate to the right of the driver, or more specifically from the right side of the cockpit. As the head of the user turns to the right to gain a better view of the passing racer, a projection of that portion of the gaming world as viewed from the standpoint of the user 450 is presented on wall 415A in area 443, wherein the projection is presented in approximately the proper location of the objects in the gaming world and in relation to a location of the character played by the user, wherein the character location is associated with a physical location of the user 450. As shown, a screen shot 430 of the projection of the secondary information includes Race Car No. 78 passing on the right side.

In one embodiment, area 443 may have been discovered during a mapping process of environment 410 previously accomplished. The mapping process discovered that area 443 may be suitable for displaying supplemental information and/or content. Companion 100 may position itself with respect to wall 415A and/or user 450 in environment 410 to properly present the supplemental information.

FIG. 4C illustrates another example of the integration of the 3D gaming world of the gaming application introduced in FIGS. 4A-4B, wherein an extension of the 3D gaming world of the gaming application is projected alongside display 310 showing the primary stream of the game play of user 450, in accordance with one embodiment of the present disclosure. As shown, instead of projecting the secondary or supplemental information on wall 415A, the information is projected on wall 415B, just to the right of display 310. For example, during the mapping process of environment 410, it may be determined that wall 415A cannot support projection of images. That is, even if companion 100 projected onto wall 415A, the video stream would not be viewable (e.g., wall 415A contains a bookcase). As such, companion 100 may project the supplemental information on wall 415B in an area 440 that still somewhat conveys the proper sense of location of the objects in the projection in the gaming world, especially in relation to the display 310 showing the primary video of the gaming application. In another implementation, the projection is an extension of the video stream presented on display 310. As such, companion 100 projects the supplemental video stream onto area 440, to include the screenshot 430', which is analogous to screenshot 430 of FIG. 4B, that includes the Race Car No. 78 in a passing position. Screenshot 430' is projected to the right side of the cockpit, as represented by the point-of-view (e.g., screenshot 425) of the character driver presented on display 310.

In one embodiment, the projection onto wall 415B may be triggered by the gaze of user 450 off-center from display 310. As shown, the head of user 450 is not turned approximately 90 degrees, as it would be in the gaming environment, but more like 45 degrees to view area 440 of wall 415B. In other embodiments, the projection may be autonomously produced by companion 100 during the execution of the gaming application. For example, the supplemental information may be automatically projected by companion 100 to provide an enhanced user experience. In that case, other supplemental information may be provided at other locations within environment 410 at other times.

Figure 5:
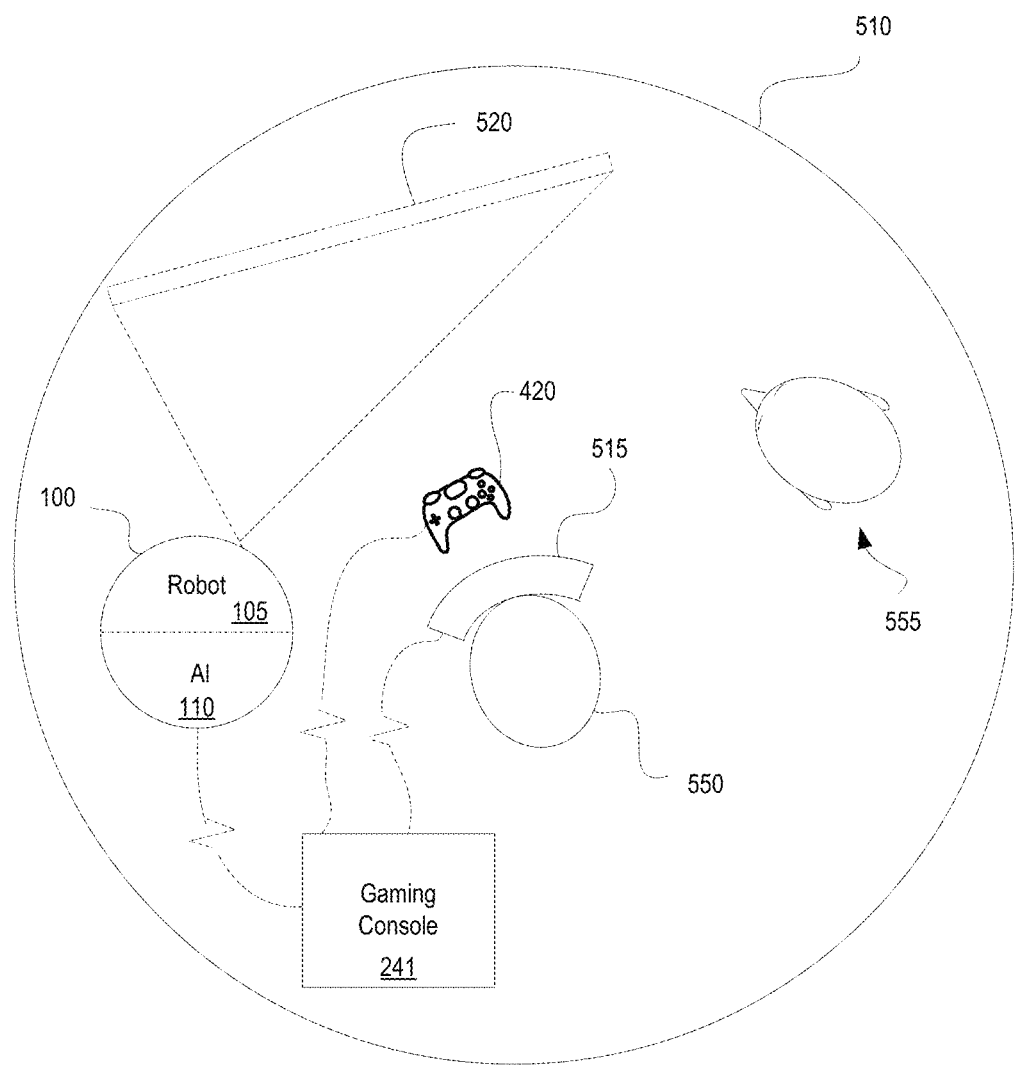
FIG. 5 illustrates the integration of a 3D virtual reality (VR) world of a gaming application played by a first user using a head mounted display (HMD) and the physical environment, wherein an autonomous personal companion is configured to project a portion of the VR gaming world into the physical environment in response to a direction of the gaze of the user to allow a spectator to have a parallel participation in the experience of VR gaming world of the first user, in accordance with one embodiment of the present disclosure.

FIG. 5 illustrates the integration of a 3D virtual reality (VR) world of a gaming application played by a user 550 using a head mounted display (HMD) 515 and the physical environment 510, in accordance with one embodiment of the present disclosure. As shown in FIG. 5, user 550 is playing a gaming application that is executing on gaming console 241 (or executed at a back-end server and streamed through the gaming console, or through any other device) in association with game play of user 550, wherein the game play is responsive to user input, such as through controller 420 and/or movement of the HMD 515.

As previously described, companion 100 is configured to provide services to the user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user. Companion 100 includes a robot form factor 105, and artificial intelligence for implementing the AI model 120 corresponding to the user 550.

More particularly, companion 100 is configured to project a portion of a virtual reality (VR) gaming world of the gaming application into the physical environment 510. For example, the projection 520 of the VR gaming world may be made onto a wall (not shown) in the environment 510. The projection 520 may also be made through a physical display that is controlled by companion 100. In this manner, the view as experienced by the user 550 may also be presented to the spectator 555. In one embodiment, the projection is made in response to a direction of the gaze of the user 550 to allow spectator 555 to have a parallel participation in the experience of VR gaming world of user 550, in accordance with one embodiment of the present disclosure. As such, if the environment 510 is suitable for projection, as the user 550 changes orientation when viewing the VR gaming world, companion 100 may also change the projection 520 to a different location within environment 510 to closely correspond to the proper location in the VR gaming world. That is, if the head of user 550 turns 90 degrees counter-clockwise, the projection 520 may be made on a wall that is to the left of user 550, and also to the left of spectator 555. In that manner, spectator may gain a sense of the VR gaming world as projected by companion application into the physical environment 510.

FIGS. 6A-6E illustrate various exemplary forms of autonomous personal companions, wherein the companions may be implemented through companion 100 as shown in FIGS. 1-5, in accordance with embodiments of the present disclosure. The companions shown in FIGS. 6A-6H are configured to provide services to a corresponding user through a local AI model 120, wherein the AI model 120 may work independent of any back-end server, or may work in a distributed fashion with an AI model 120 located at a back-end server to predict, in part, the behaviors, responses, actions, reactions, wants and/or needs of the user.

Figure 6A:
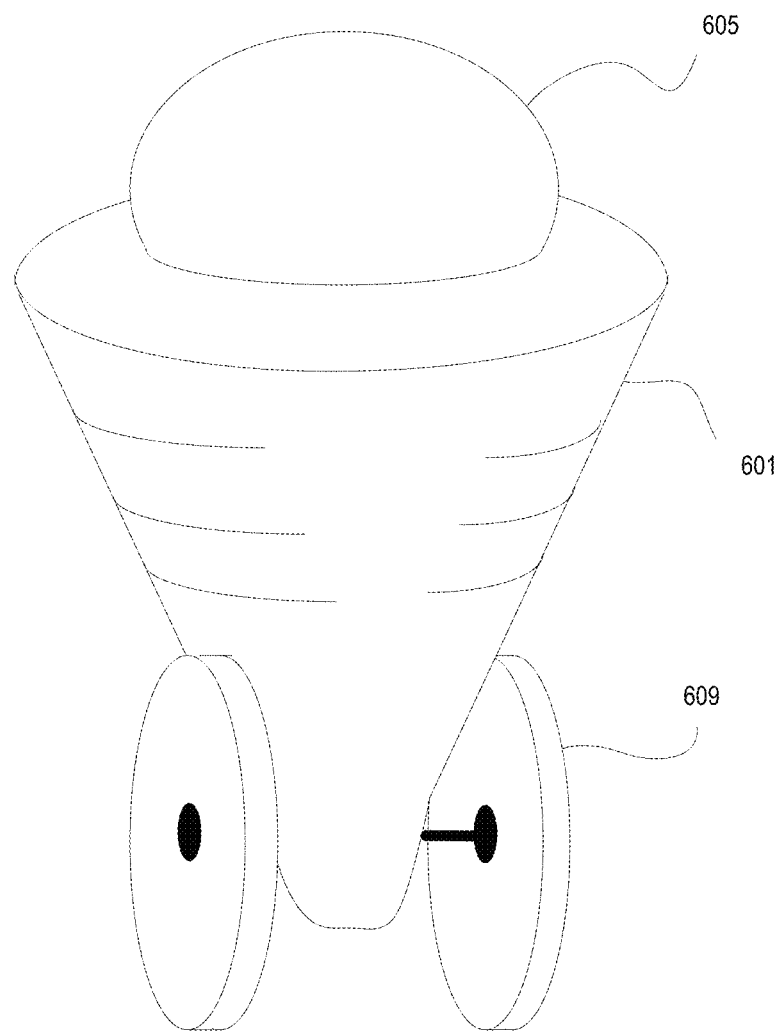
FIG. 6A illustrates an exemplary form of an autonomous personal companion for a user that is implemented using an AI, in accordance with one embodiment of the present disclosure.

In particular, FIG. 6A illustrates an exemplary form of companion 600A for a user that is implemented through an AI model of the user, in accordance with one embodiment of the present disclosure. Though FIG. 6A shows a generic form factor, companion 600A may be implemented within any suitable form factor. For example, body 601 is shown having a conical shape with the lower portion of smaller diameter than an upper portion. An upper housing 605 may protrude from body 601 to facilitate additional features of companion 600A.

In particular, companion 600A includes one or more wheels 609 in the lower portion, or any suitable means for providing mobility in two or three dimensions for companion 600A. In that manner, companion 600A may move around within environment as necessary to provide its services. For example, companion 600A may independently move around an environment to capture the best images of the environment, or to select the best location for projecting video and/or images. In addition, body 601 may rotate in one location to provide the best orientation for companion 600A within the environment.

Figure 6B:
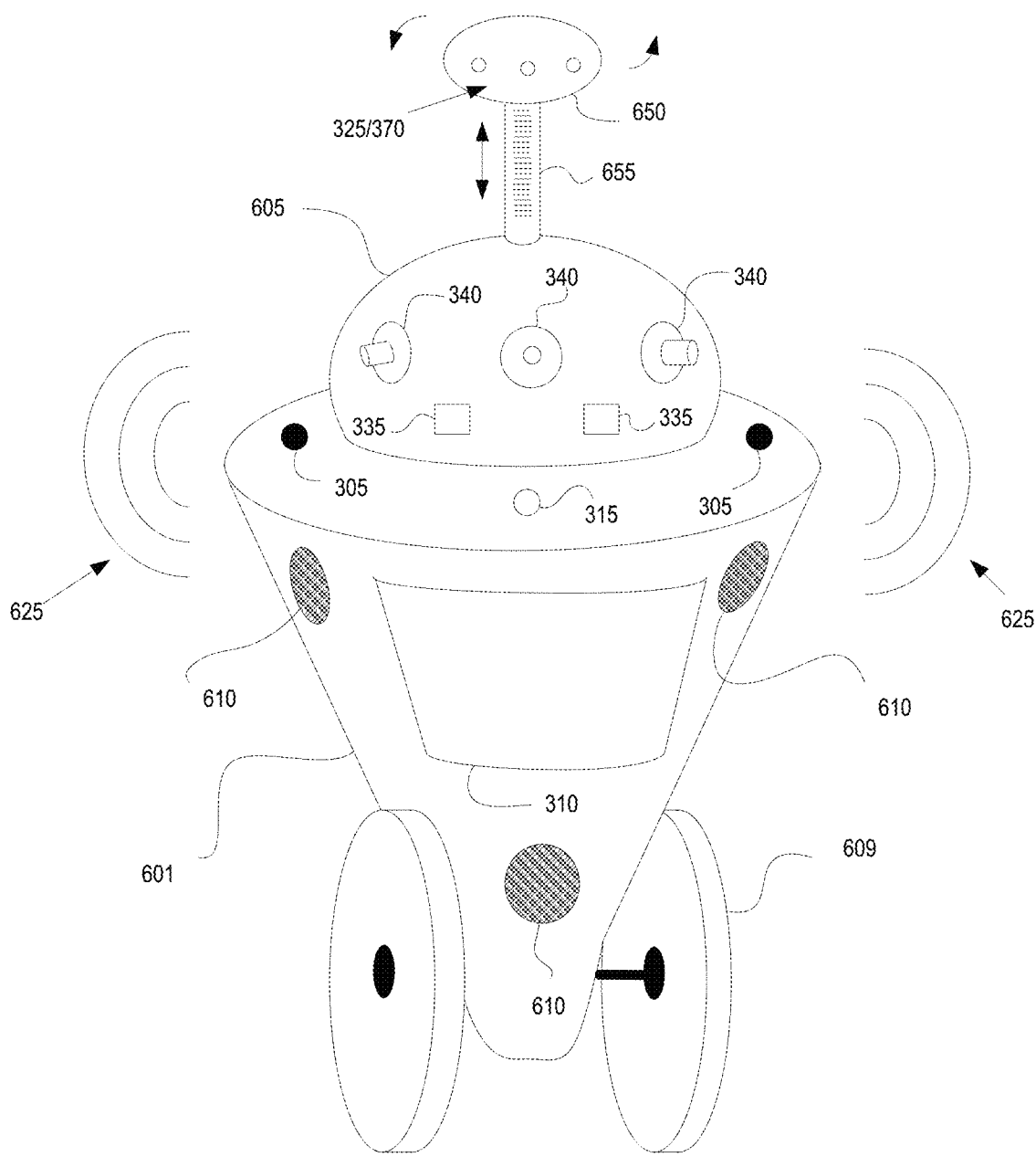
FIG. 6B illustrates an exemplary autonomous personal companion configured with an array of capabilities to include, in part, the projection of images, the sensing of the proximate environment, and the providing of auxiliary sound, in accordance with embodiments of the present disclosure.

FIG. 6B illustrates an exemplary autonomous personal companion 600B configured with an array of capabilities to include, in part, the projection of images, the sensing of the proximate environment, and the providing of auxiliary sound, in accordance with embodiments of the present disclosure. In particular, companion 600B is shown having the generic form factor with body 601, and first introduced in FIG. 6A. In addition, wheels 609 are shown to represent the ability for motion through an environment.

Companion 600B includes speakers 610 arranged throughout body 601. In addition, speakers 610 may be located in other portions of companion 600B, such as in upper housing 605. Display 310 is located on the surface of body 601, and is configured to present information and/or data when performing services for the corresponding user. For example, display 310 may display text when querying the user for a response, or present video or text in response to a query from the user. Display 310 may also present other supplementary information, such as that generated in association with the game play of a user playing a gaming application.

Companion 600B includes one or more sensors used to sense the environment, wherein the sensors may be located at various locations on the companion surface. For example, depth sensors 305 may be located on the surface of the upper portion of body 601, wherein the depth sensors are configured to determine locations of near and far objects within the environment. One or more depth sensors 305 may also be used to determine the composition of the objects, or the surface hardness of the objects. In addition, one or more proximity sensors 335 may be located in the surface of the upper housing 605, wherein the proximity sensors may be configured to determine the location of objects near to the companion 600B. As previously described, depth and proximity sensors may employ various techniques (e.g., electromagnetic fields, induction, radio frequencies, thermal variations, infrared frequencies, air flow, etc.), as shown by signals 625, to determine locations of objects.

In addition, the upper portion of body 601 includes one or more microphones 315, configured for capturing audio recordings of the environment. For example, audio of the corresponding user may be recorded to capture the live reactions of the user, which may be replayed at a later time. Also, recorded audio may be synchronized with recorded video captured by video recorder 370 located in capsule 650. Also, image camera 325 may be located in capsule 650. The combination of image camera 325 and video recorder 370 allows companion 600B to capture video and/or images of the user and/or environment.

As shown, capsule 650 has various degrees of motion and orientation. Capsule 650 is attached to lift mechanism 655, and can move up and down in relation to body 601 of companion 600B. For example, capsule 650 may raise itself to gain a better view of the environment, such as when camera 325 or recorder 370 are blocked by an object (e.g., wall, couch, furniture, book case, etc.). In addition, capsule 650 may rotate about the shaft of the lift mechanism 655, such that the rotation may occur in relation to a static body 601.

Upper housing of companion 600B may include one or more projection systems 340. As previously described, projection systems 340 may project supplementary information onto a surface of the environment (e.g., wall of a room). The surface may be determined through a mapping of the environment, as previously described. The supplementary information may be used for communicating with the user when the companion 600B is providing services to the user.

Figure 6C:
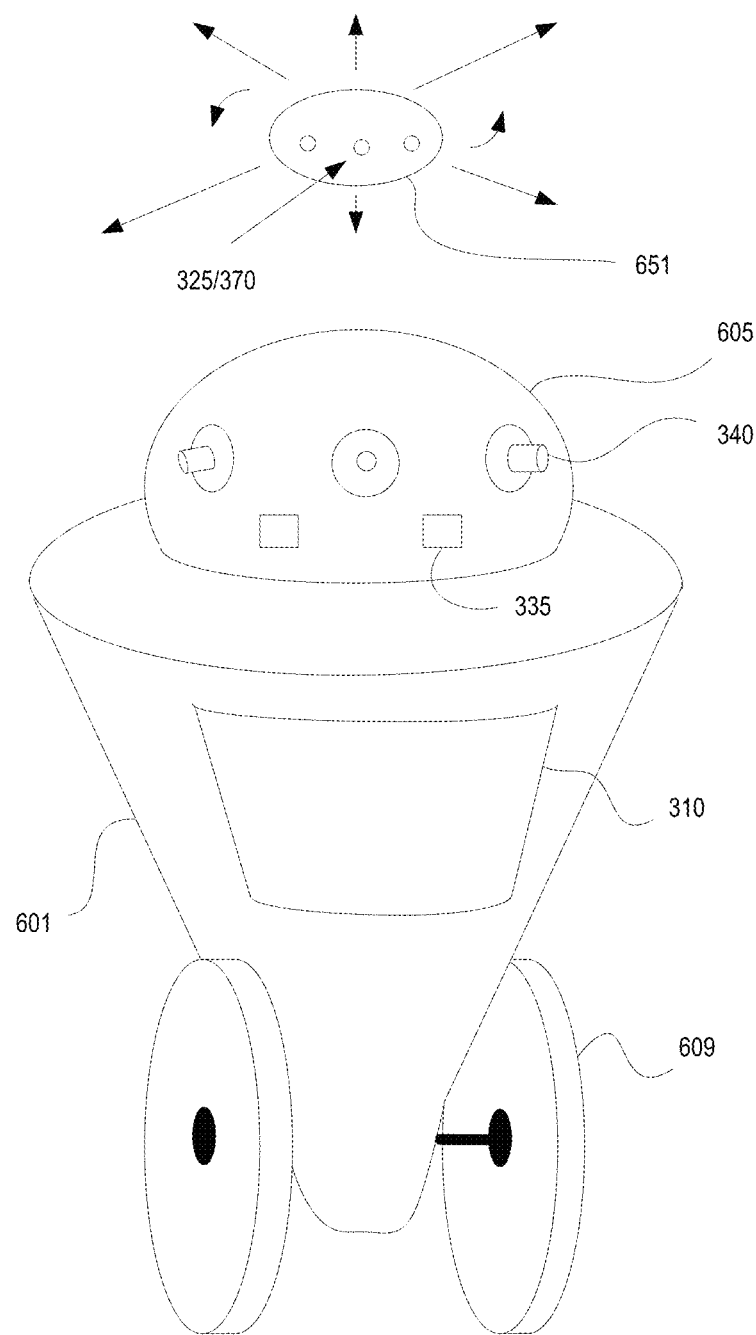
FIG. 6C illustrates an exemplary autonomous personal companion including a drone assembly that is configured with one or more features, for example image capturing and image projection, in accordance with one embodiment of the present disclosure.

FIG. 6C illustrates an exemplary autonomous personal companion 600C including a drone assembly 651 that is configured with one or more features, for example image capturing and image projection, in accordance with one embodiment of the present disclosure. As shown, companion 600C has one or more features previously introduced, to include a body 601 generically represented, means for movement (e.g., wheels 609 as shown), a display 310, proximity sensors 335, and projectors of a projection system 340. Other features previously introduced are not shown for purposes of clarity.

In particular, companion 600C includes drone assembly 651 that is coupled to upper housing 605 (or any other suitable surface area capable of receiving assembly 651) when in a resting position. For instance, drone assembly 651 may interface with upper housing 605 for purposes of charging a battery. Other resting locations are contemplated that are remote from companion 600C, such as a separate base station. Further, drone assembly 651 is communicatively coupled to one or more components of the companion 600B, such as controller 355. Image camera 325 and/or video recorder 370 may be located on drone assembly 651 for purposes of capturing images and video. Other components may also be located on assembly 651, such as a projector of the projection system 340.

As shown, drone assembly 651 is able to move about within the environment. Any suitable means for providing movement are contemplated, such as propeller systems, air flow systems, light air systems, tethering systems, etc. As such, drone assembly 651 is able to move in three dimensions throughout the environment, and rotate itself within the environment. Movement may be necessary in order to place the camera 325 and/or video recorder 370 in a better position for capturing images and/or video. For example, the view of a room in a certain direction as taken from a point corresponding to body 601 and upper housing 605 of companion 100 may be blocked by an object. The drone assembly 651 may be deployed to a location that is not obstructed by the object (e.g., straight up) in order to capture the view.

Figure 6D:
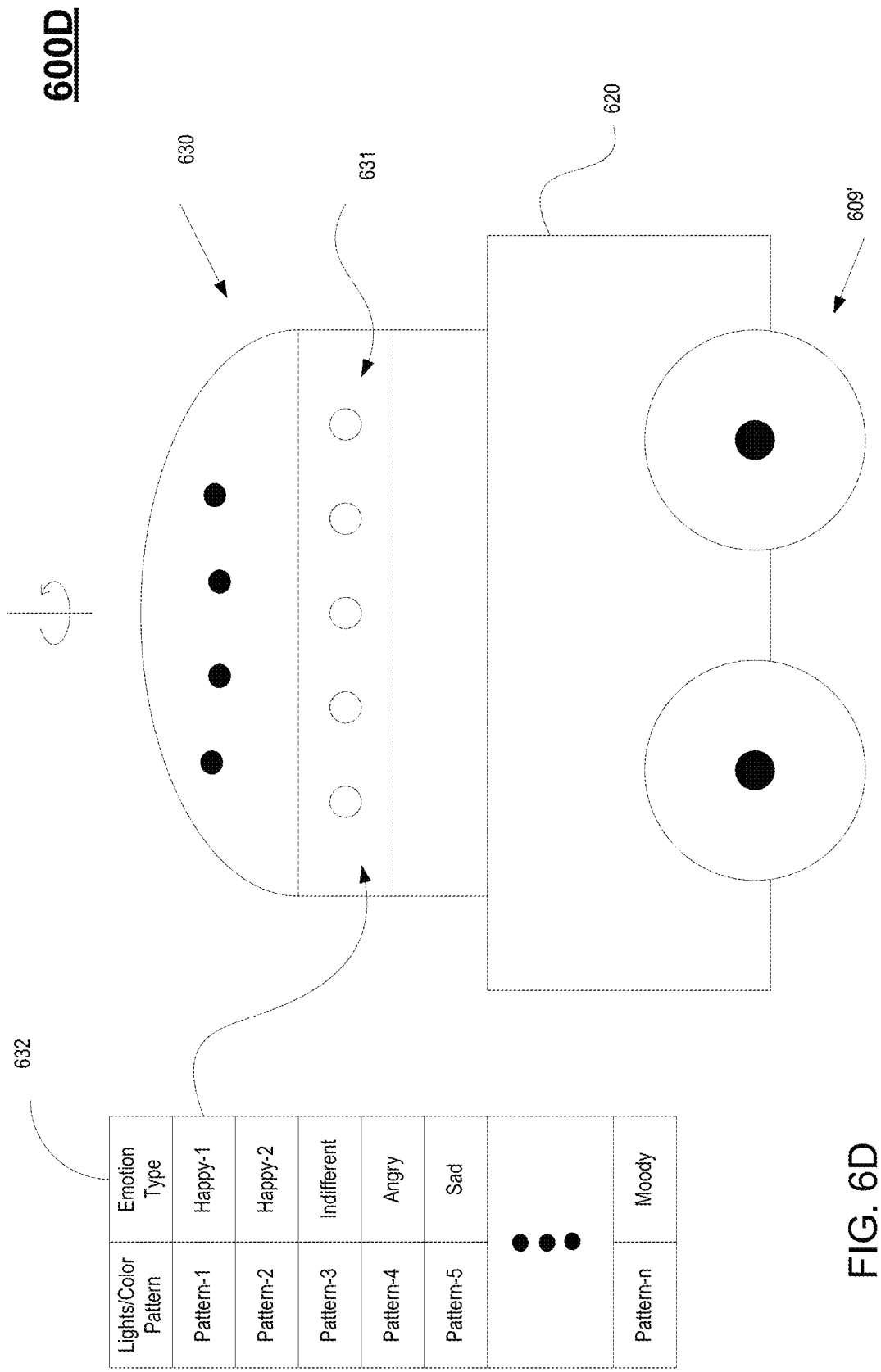
FIG. 6D illustrates an exemplary autonomous personal companion including a rotating top portion configured with one or more features, for example image capturing and image projection, in accordance with one embodiment of the present disclosure.

FIG. 6D illustrates an exemplary autonomous personal companion 600D including a rotating top portion 630 configured with one or more features, in accordance with one embodiment of the present disclosure. Companion 600D is shown to illustrate different form factors suitable for implementing the local AI model 120 of a corresponding user. As shown, companion 600D includes a base 620. Mobility means are provided within base 620, such as wheels 609', or any other suitable means for motion previously described.

In particular, companion 600D include top portion 630, which may include cameras 325, video recorders 370, depth sensors 305, proximity sensors 335, etc. For illustration, top portion 630 may be rotatable about the base 620. In that manner, companion 600D may orient itself to best provide services to a user (e.g., place itself in a good position for communicating with user). That is, combining the mobile features of companion 600D and the rotating top portion 630, a variety of orientations are possible of the companion within its environment. For example, top portion 630 may be rotated towards an object in the environment to give a camera system a good view of the object. Further, companion 600D may move closer to the object to give the camera system a better view of the object.

In some implementations, rotation of the top portion 630 is able to convey emotion or display some behavior of the companion 600D. In that case, top portion 630 may be outfitted with multi-colored lighting that are programmed to show emotion. For example, a band of lights 631 is shown on top portion 630. Each of the lights in band 631 may be turned on or off according to a corresponding pattern. In addition, each of the lights in band 631 may show a sequence of colors according to corresponding pattern. Table 632 shows a list of light patterns (e.g., on/off, color sequence, etc.), wherein each pattern may be associated with a corresponding emotion of the companion 100. For example, pattern-1 may be associated with a first happiness emotion, and pattern-2 may be associated with a second type of happiness. Other emotions may be exhibited through other patterns, such as showing indifference, angriness, sadness, moodiness, etc.

Figure 6E:
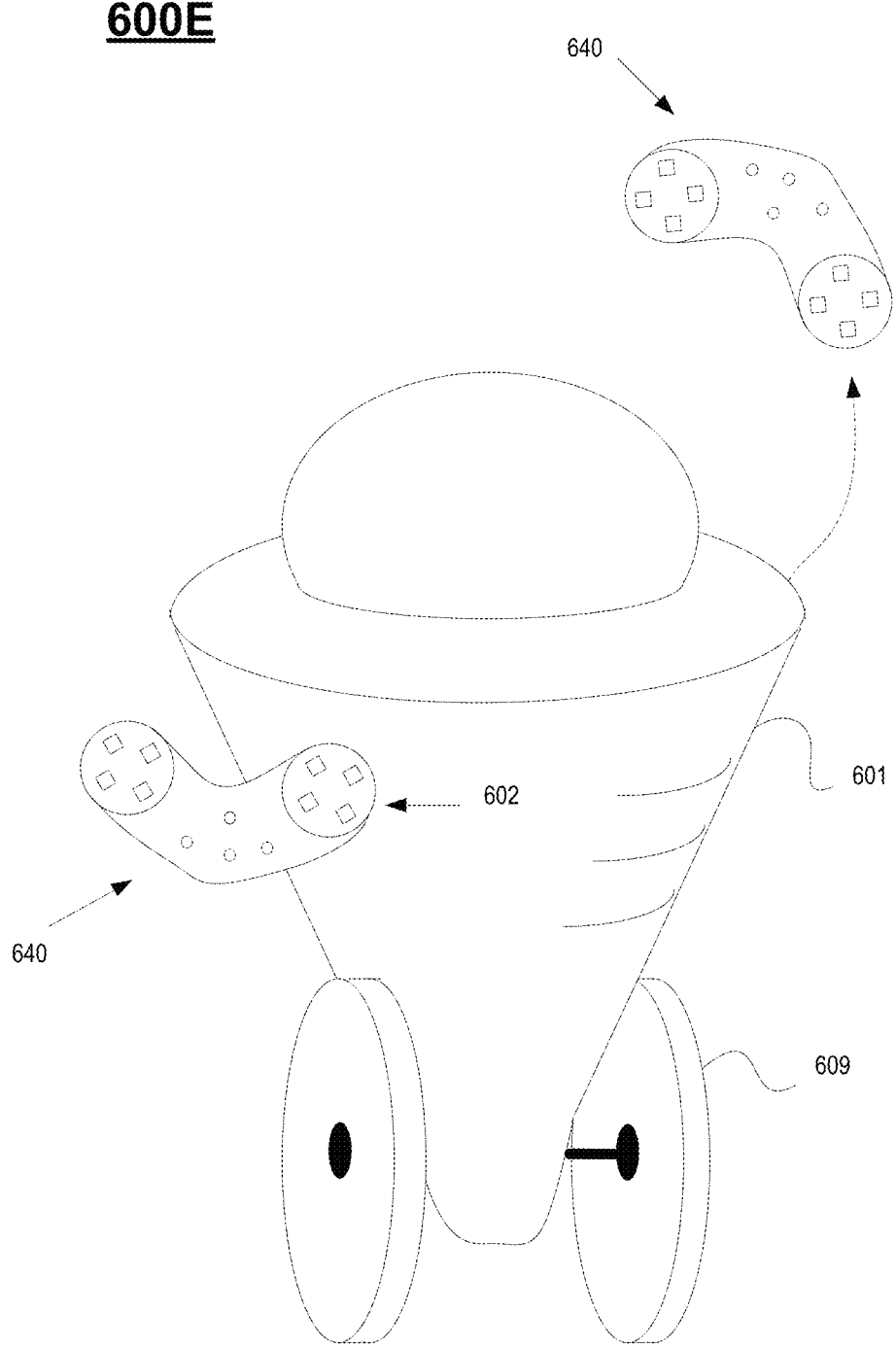
FIG. 6E illustrates an exemplary autonomous personal companion including one or more appendages, wherein the appendages may take the form of controllers, wherein the appendages/controllers may be removable from the companion, in accordance with one embodiment of the present disclosure.

FIG. 6E illustrates an exemplary autonomous personal companion 600E including one or more appendages 640, in accordance with one embodiment of the present disclosure. As shown, companion 600E has one or more features previously introduced, to include a body 601 generically represented, and means for movement (e.g., wheels 609 as shown). Other features previously introduced are not shown for purposes of clarity.

In particular, appendages 640 may provide controller functionality. For example, appendage 640 may include controller 420, and may interface with gaming console 241 for purposes of providing control instructions during the execution of a gaming application on gaming console or at a back-end server. In one embodiment, one or more of appendages 640 may be removed for easier manipulation and handling. In that manner, the user may interface with appendage 640 in the normal manner of handling a gaming controller.

In one embodiment, each appendage 640 is configured with a recharging port that is capable of coupling to a base charging port. An internal battery (not shown) is located within the corresponding appendage 640. The base charging port may be located on body 601, such as within connections associated with pivot point 602. In that manner, as the appendage 640 is replaced back onto the body 601, charging of the internal battery may occur. That is, power (e.g., electric charge) is transferred through the body 601 of companion 600E to the internal batter of appendage 640, in one embodiment. In another embodiment, power is transferred in the opposite direction, such that power is transferred from the internal battery to the companion 600E. In that manner, appendage 640 may be configured as the primary recharging medium for supplying power to companion 600E, and may be removed to be electrically and/or communicatively coupled to a base charging station separate from body 601. While appendage 640 is decoupled (e.g., recharging), companion 600E may continue to operate using an internal battery source, wherein the battery source can be recharged once appendage 640 is again coupled to body 601.

In one embodiment, appendages 640 act as arms for companion 600E. For example, appendage 640 may move about a pivot point 602 on body 601. Movement of appendage 640 may provide some communication. For instance, a pattern of movement of appendage 640 may signal a greeting by companion 600E. In another instance, appendages 640 may be extended outwards from body 601 to show a welcoming stance of companion 600E. In still another instance, an appendage 640 may be extended to provide a hand shake or first bump with a user. Other motions are contemplated. In addition, the appendages may be of any form or configuration, in other embodiments. For instance, the head or upper housing 605 configured as an appendage of the companion 600E may be detachable from the body 601.

Embodiments of the present invention support various alternative form factors for the autonomous personal companion, in accordance with embodiments of the present disclosure. Further embodiments provide for communication between two autonomous personal companions 100 either directly, or through a network. As an illustration, each of the companions may be performing operations related to mapping of a room in a building that requires moving around the room, wherein during their movements one companion or both companions may sense another companion in the proximity. The companions may further move themselves into positions for purposes of communicating with each other. In one implementation, each of the companions may be associated with a corresponding QR code. The QR code codes may be used to exchange identification information. For example, a QR code provides access to information (e.g., via a back-end server) about a corresponding companion. As such, the companions may move themselves to locations where the QR code codes may be passed (e.g., bringing a display showing a QR code of a first companion within viewing range of a camera system of a second companion). Once captured, the QR code then may be delivered to a server over a network to access identification information about the companion associated with the captured QR code. In that manner, identifying information may be exchanged between companions.

Modular Hierarchical Vision System and Method

Accordingly, the various embodiments of the present disclosure describe systems and methods implementing machine learning techniques to build an AI model personalized to a user. The local AI model is implemented through an autonomous personal companion that is mobile, wherein the autonomous personal companion is configurable to provide contextually relevant and personalized assistance to the user. The personal companion was previously introduced in FIGS. 1-6. Personalization of the local AI model is achieved by filtering subjective and/or objective input data used within a deep learning engine 190 to generate the model. If filtering is not performed, then the AI models (local and global) all would be built using the same dataset, and as such would all be the same thus having the same personality (e.g., would achieve the same results for a given input set). In that manner, local AI models are generated with varying personalities, such that each AI model can be unique and reflect or be associated with the personalities of the corresponding user.

In addition, embodiments of the present invention disclose the identification of objects within an environment as captured by an autonomous personal companion and using a classifier hierarchy of classifiers that when traversed can identify an object. A scene is captured to obtain various types of data, wherein the scene include one or more objects. Data relating to a particular object may be isolated for further analysis, wherein the data may include video, image, audio, text, temperature, pressure, tactile, sonar, infrared, etc. The related data may be analyzed to determine which object class a targeted and identified object (e.g., from a captured scene) belongs to within a classifier hierarchy that may be built through machine learning. The classifier hierarchy is composed of a set of root classifiers trained to recognize objects based on separate generic classes. Each root classifier acts as the parent node of a tree of child nodes, where each child node contains a more specific variant of its parent object class as represented by the root or generic classifier. A method for object identification covers walking the tree of child nodes in order to classify an object based on more and more specific object features. The system is further comprised of an algorithm designed to minimize the number of object comparisons while allowing the system to concurrently categorize multiple objects in a scene.

Figure 7:
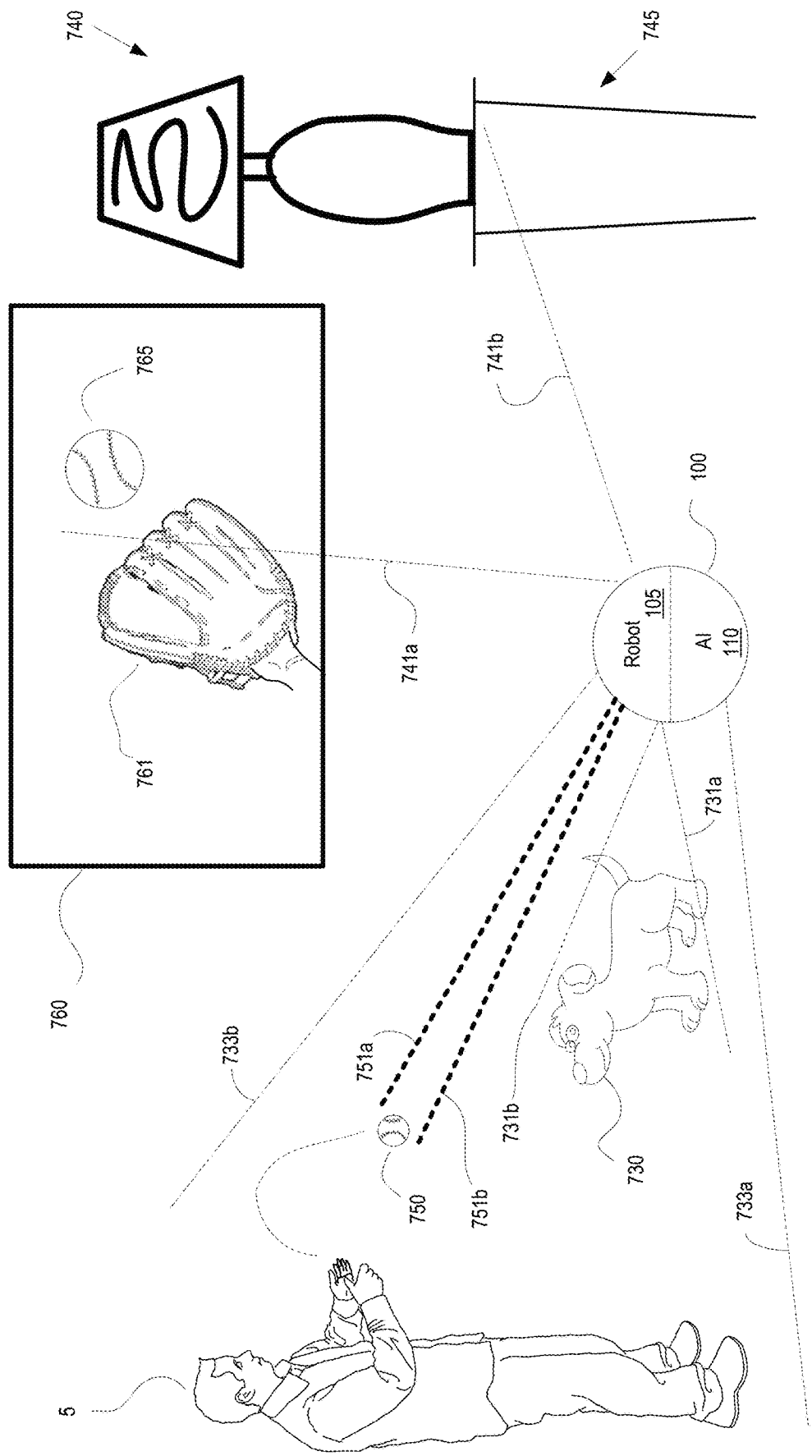
FIG. 7 is an illustration of a scene, wherein one or more objects in the scene may be targeted for identification using a classifier hierarchy built through artificial intelligence, in accordance with one embodiment of the present disclosure.

FIG. 7 is an illustration of a scene 700, wherein one or more objects in the scene may be targeted for identification using a classifier hierarchy built through artificial intelligence, in accordance with one embodiment of the present disclosure. The scene may be a moment in time of an environment of the user 5. For example, user 5 may be in a family room that includes a lamp 740 sitting on a table 745. A display 760 may be mounted on a wall (not shown). The display may show a video frame that is a close-up of a baseball glove 761 in position to catch a baseball 765. In the scene, the user 5 is playing fetch with a dog 730, using an object, which is identified as a ball 750, and more particularly—a baseball.

Data of the scene is captured by the autonomous personal companion 100. The personal companion includes the robot 105 having any suitable body, and artificial intelligence 110, both previously described. In addition, personal companion 100 is configured to identify objects in the scene 700 using a classifier hierarchy of classifiers (e.g., classifier hierarchy 820). For a targeted object in the scene 700, the classifier hierarchy is walked by matching and connecting classifiers at different levels in the hierarchy until reaching an end classifier at the deepest level. The end classifier represents an object class that can be used to identify the targeted object.

Personal companion 100 is configured to capture the scene 700 using various techniques. Captured data may include video, image, audio, text, temperature, pressure, tactile, as well as other information. In FIG. 7, personal companion 100 may capture various parts of the scene 700. For example, personal companion may capture and/or isolate image data between dotted lines 731a-731b, wherein the captured data includes an object—dog 730. In addition, personal companion may capture and/or isolate image data between dotted lines 733a-733b, wherein the captured data includes multiple objects, including user 5, baseball 750, and dog 730. Further, personal companion may capture and/or isolate image data between dotted lines 751a-751b, wherein the captured data includes an object—baseball 750. Also, personal companion may capture and/or isolate image data between dotted lines 741a-741b, wherein the captured data includes multiple objects, including portions of display 760, portions of the video image on the display including portions of glove 761 and baseball 765, lamp 740, and portions of table 745.

Though discussed throughout the application as image data used for identifying objects, captured data may include various types of data that are each associated with objects in the scene. In addition, the objects themselves may take on various forms, to include visible forms, as well as non-visible forms (e.g., wind, sound, presence, etc.).

Figure 8A:
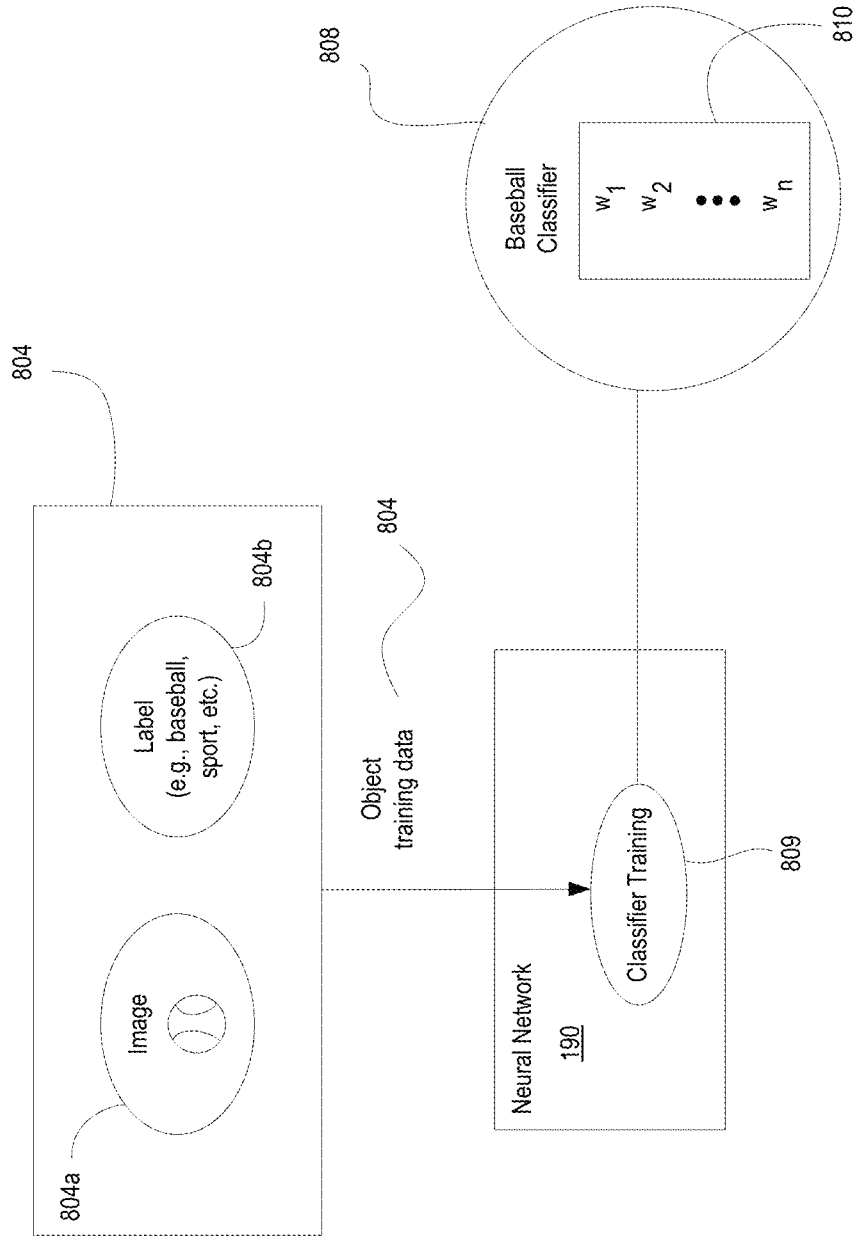
FIG. 8A is an exemplary illustration of a training phase using artificial intelligence to build classifiers in a classifier hierarchy, each configured to recognize a corresponding object based on internal representations of that object, in accordance with one embodiment of the present disclosure.

FIG. 8A is an exemplary illustration of a training phase using artificial intelligence to build classifiers in a classifier hierarchy, each configured to recognize a corresponding object based on internal representations of that object, in accordance with one embodiment of the present disclosure. In particular, object training data 804 is presented to artificial intelligence, such as that implemented by neural network 190. For example, the object training data may include an image 804a of the object. For illustration purposes only and to provide a consistent example of an object or its related objects, the object may be a baseball. As such, the image 804a may include a baseball (e.g., a real baseball is captured in one or more images). In addition, the object training data 804 may include labeling 804b. For example, labeling 804b may provide positive identification of the object as a baseball. Additionally labeling may be provided further describing the object, such as the baseball object may fall within a broad category of objects—"sports." For instance, the sports category includes all balls used in sports.

The object training data is provided to the neural network 190 to perform classifier training. Specifically, the classifier training module 809 is configured to receive training data specific to a particular object (baseball) or object category (e.g., round objects, sports for balls, etc.), and build a classifier that can recognize later captured objects that match the internal representation of the object as defined by the training data. For example, for training data specific to a baseball, the classifier training module 809 of the neural network 190 is able to build a baseball classifier 808 that defines an internal representation of an object class that is a baseball. In particular, the internal representation may include a set of weights 810 (e.g., $w_1, w_2 \ldots w_n$, as determined through artificial intelligence.

Figure 8B:
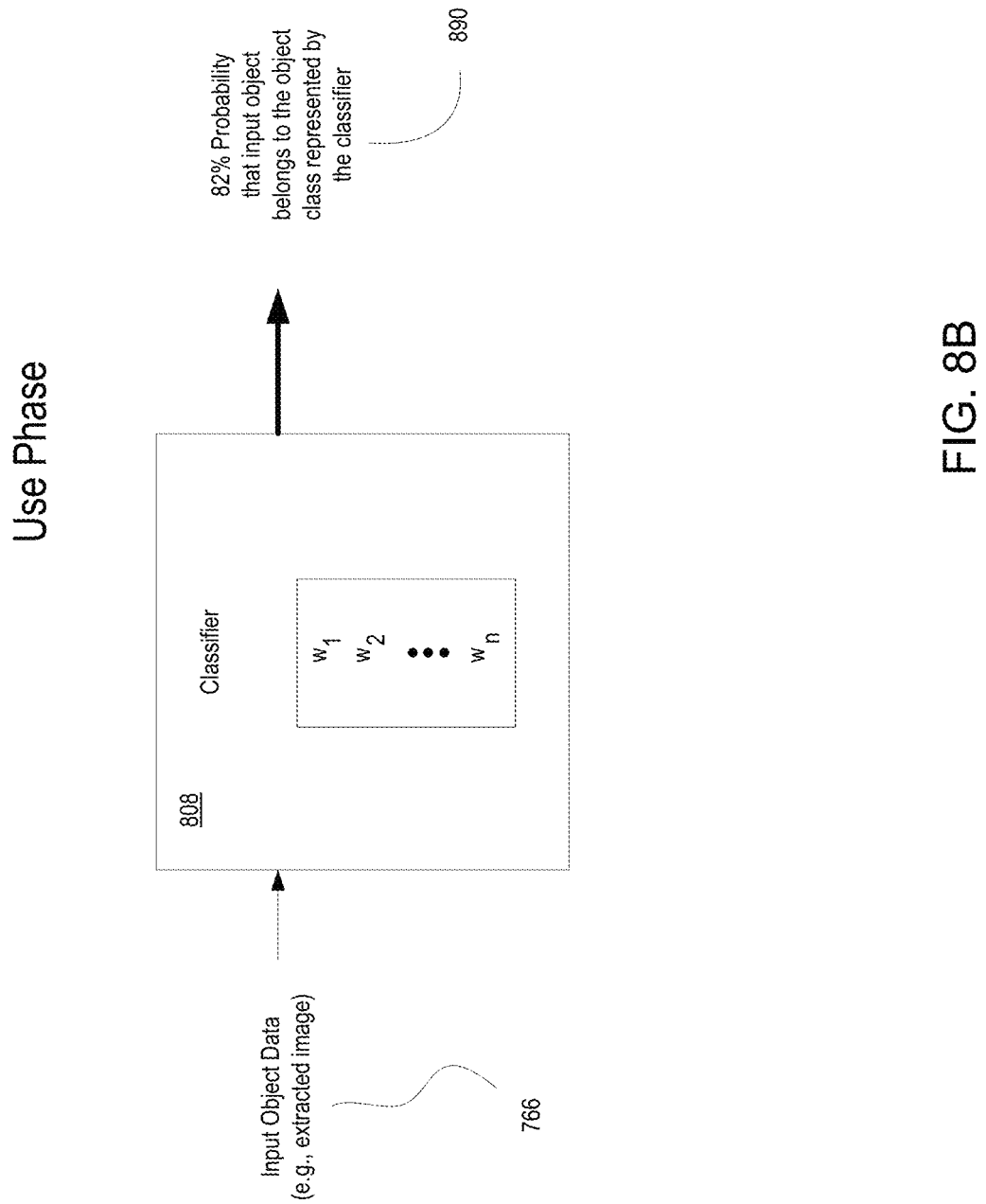
FIG. 8B is an illustration of a use phase of the classifiers built in FIG. 8A, wherein a classifier of the classifier hierarchy is configured to analyze object input data to generate a probability that can be used to determine whether the input object fits within the object class represented by the classifier, in accordance with one embodiment of the present disclosure.

The baseball classifier 808 is able to analyze a later captured object or targeted object and determine the probability that the targeted object belongs to the object class defined by the baseball classifier, the probability being generated by the baseball classifier using data representing the targeted object. In some implementations, the baseball classifier can generate a probability that the targeted object belongs to the object class, and a probability that the targeted object does not belong to the object class (e.g., where the sum of both probabilities equals 1). For example, when the probability generated by the baseball classifier 808 exceeds a margin, then the targeted object may then be identified as fitting within the object class representing a baseball. That is the target object is recognized or identified as a "baseball." In particular, FIG. 8B is an illustration of a use phase of the classifiers built in FIG. 8A, wherein a classifier of the classifier hierarchy is configured to analyze object input data to generate a probability that can be used to determine whether the input object fits within the object class represented by the classifier, in accordance with one embodiment of the present disclosure.

Specifically, data for an image is captured. For example, an image of a scene may be captured using a video capture device, wherein the scene includes one or more objects. A targeted object in the data or image may be extracted to include input object data 766. For example, an image 1070 may include object data 766 associated with a baseball 765. The object data is provided as input to one or more classifiers when walking a classifier hierarchy. As shown, the object data 766 is provided as input to a baseball classifier 808 to generate a probability that can be used to determine whether the object associated with the object data 766 fits within an object class represented by the baseball classifier 808. That is, classifier 808 determines if the target object is a baseball.

For example, given the input object data 766, the classifier 808 generates a probability that the input object data belongs to the object class represented by classifier 808. The probability is generated based in part on the weights of the classifier 808 defined during training. As shown, the target object represented by the input object data 766 has an 82 percent probability (890) of fitting within the object class represented by the baseball classifier 808.

Figure 8C:
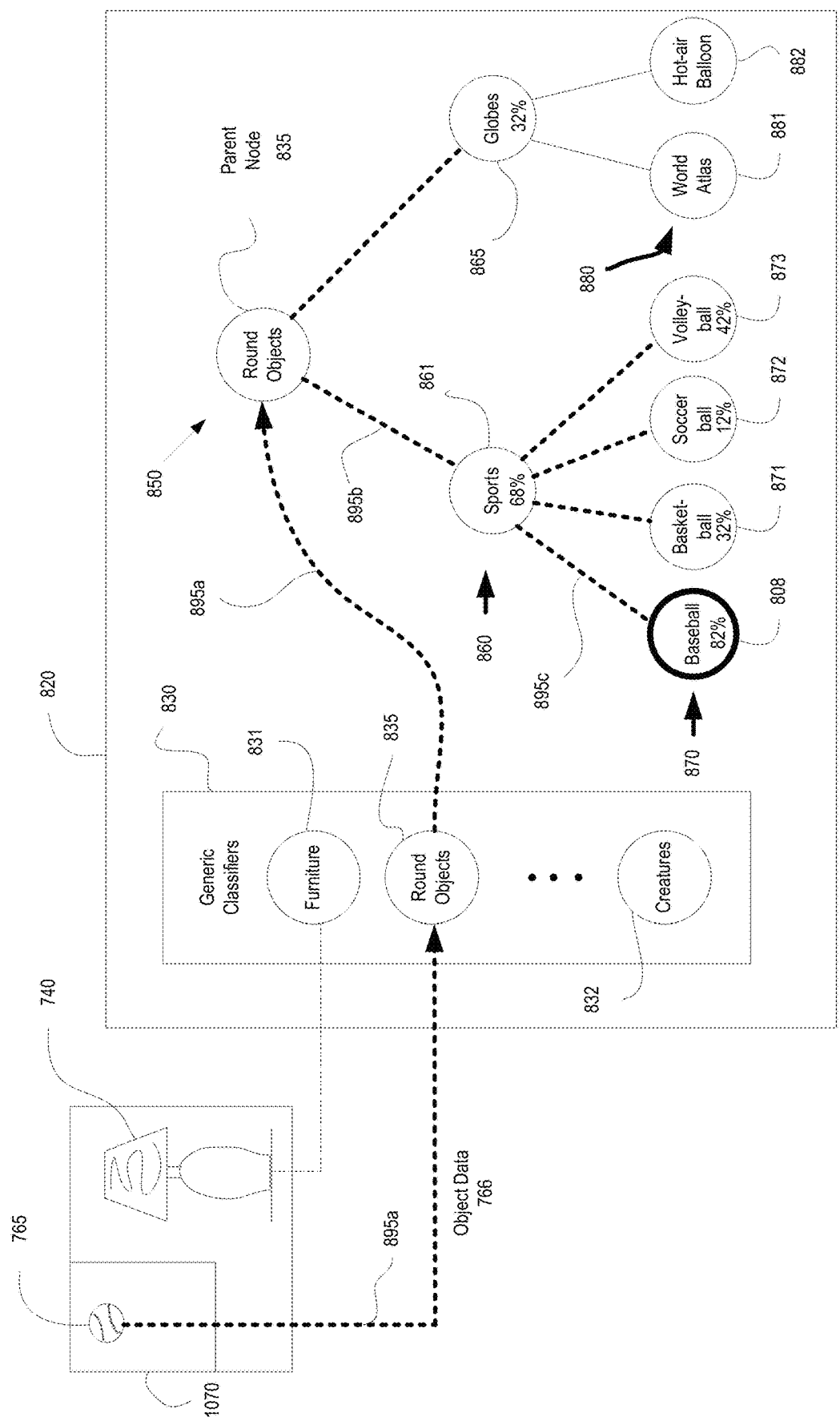
FIG. 8C is a data flow diagram illustrating the use of a classifier hierarchy to identify a targeted object of a scene, in accordance with one embodiment of the present disclosure.

FIG. 8C is a data flow diagram illustrating the use of a classifier hierarchy to identify a targeted object of a scene, in accordance with one embodiment of the present disclosure. For example, FIG. 8C provides a data flow of the classifier use process described in FIG. 8B. As shown, an image 1070 from a scene is received. The image 1070 may be captured (e.g., using an image capturing device of an autonomous personal companion 100) from the scene 700 introduced in FIG. 7, wherein the scene includes a baseball 765 shown on a display and a lamp 740. In particular, the image 1070 may be analyzed to identify image objects within the image 1070, such as the image object 766 for the baseball and the image object for the lamp. Embodiments of the present invention may be used to walk a classifier hierarchy 820 to recognize or identify those targeted and/or identified objects (e.g., baseball 765 or lamp 740).

An identified object that is targeted for recognition is the baseball 765. The associated image object of the baseball 765 in the captured image is represented by object data 766. The object data 766 is provided as input to the classifier hierarchy 820 for purposes of identifying to which object class that targeted object belongs. Specifically, the object data 766 is provided as input into each of the generic classifiers in the group 830, such as furniture classifier 831, round objects classifier 835 . . . creatures classifier 832. Given the object data 766, the generic classifiers are executed to identify a matched generic classifier.

For example, all of the generic classifiers in the group 830 combined will generate a plurality of probabilities using the same input object data 766. The probabilities indicate how close the object data 766 fits within the generic class represented by each of the generic classifiers in the group 830. In particular, a corresponding generic classifier includes a corresponding set of weights that define an internal representation of a corresponding class of objects, and that can be used to generate a probability that object data fits within the corresponding class of objects. The corresponding set of weights is learned from corresponding training data supplied to a neural network 190. Specifically, each classifier is executed and generates a corresponding probability that the object data belongs to the class (e.g., parent class) of the corresponding generic classifier, as previously described. A matched generic classifier is chosen as having the highest probability in the plurality of probabilities that the object data representing the baseball 766 matches the generic/parent class represented by the matched classifier (e.g., round objects 835), in one embodiment.

As shown in FIG. 8C, the round object generic classifier 835 is selected for the object data 766 (of the target object baseball 765) in the captured image 1070, as shown in path 895a. In one embodiment, the round object generic classifier 835 is selected as having the highest probability that the object data representing the baseball 766 matches the generic/parent class represented by the matched classifier (e.g., round objects 835). The probability may also exceed a predefined margin. In another embodiment, generic classifiers are selected when their respective probabilities exceed a predefined margin.

Each generic classifier has a tree of child nodes or tree of classifiers 850 (sub-classifiers under the parent classifier defined by the generic classifier). The tree of classifiers includes one or more hierarchical levels of classifiers under the parent or generic classifier. That is, each level is connected to at least one other level. For example, the round objects classifier 835, acting as a parent node to the tree 850, has at least one hierarchical level of classifiers 860, including the sports classifier 861 and the globes classifier 865. Additional levels may be defined under child node(s) or levels of classifiers. For example, a hierarchical level 870 of classifiers is below the sports classifier 861, including baseball classifier 808, basketball classifier 871, soccer ball classifier 872, and volleyball classifier 873. Also, another hierarchical level 880 may be defined under the globes classifier 865, including the world atlas classifier 881, and hot-air balloon classifier 882. FIG. 8C is exemplary, and may include one or more child nodes under a parent node arranged in one or more levels (e.g., n-child nodes under a higher parent node arranged in a parent child relationship in tree 850).

Classifiers in each succeeding lower level are trained using more and more specific sets of training data. For example, the training data used for learning the round objects classifier 850 includes a broad set of objects that may be defined as being a round object, such as a baseball and a hot-air balloon. At the next level, more specific sets of training data is used to learn/build more specific classifiers, such as the sports classifier 861 (e.g., trained on a baseball, basketball, tennis ball, volleyball, etc.) and the globes classifier 865 (e.g., trained on an atlas, a hot-air balloon, etc.). At a next lower level, even more specific set of training data may be used to learn/build even more specific classifiers, such as those under the sports classifier 861, including a baseball classifier 808 trained using a variety of baseballs, a basketball classifier 871 trained using a variety of basketballs, a soccer ball classifier 872 trained using a variety of soccer balls, and a volley ball 873 trained using a variety of volleyballs.

Once the generic classifier 835 is selected and/or matched, the corresponding tree of child nodes or classifier tree 850 associated with the generic classifier 835 is walked using the object data 766. In particular, each child node in the classifier tree at each level is analyzed using the respective classifiers of that level. As shown in FIG. 8C, the tree is walked down to the next level 860 down from the parent node, as represented by the generic classifier 835, to include the sports classifier 860 and the globes classifier 865. That is, classifiers in level 860 are analyzed using the input object data 766 to determine how closely the object data matches the object class represented by their respective classifier. For example, the sports classifier 861 will generate a probability that indicates how well the object data 766 representing the baseball matches the object class represented by the sports classifier 861. As shown in FIG. 8C, the sports classifier 861 generates a 68 percent probability that the object data 766 fits within the object class defined by the sports classifier, and the globes classifier 865 generates a 32 percent probability that the object data 766 fits within the object class defined by the globes classifier. The sports classifier 861 is selected as having the highest probability (e.g., walking the classifier tree 850 along path connector 895b). In addition, the probability generated by the sports classifier 861 exceeds a predefined margin. As such, the object data 766 is presumed to belong to the sports class (e.g., class of objects related to sports) represented by the sports classifier 861. In addition, because the globes classifier 865 is not selected because it has a lower probability or does not meet a predefined threshold, the child nodes under the globes classifier 865 are not executed.

As such, the path through the classifier tree 850 goes to the next level 870 to determine which classifier matches the input object data 766. That is, classifiers in level 870, having a parent node as the sports classifier 861, are analyzed using the input object data 766 to determine how closely the object data matches the object class represented by their respective classifier. Also, classifiers in level 880, having a parent node as the globes classifier 865, are not analyzed because the globes classifier 865 has been removed from consideration. Each of the classifier nodes at level 870 under the sports classifier 861 processes the object data 766 to produce a probability that the object data 766 is represented by that respective classifier. For example, the baseball classifier 808 is executed to generate a probability that indicates how well the object data 766 representing the baseball matches the object class represented by the baseball classifier. A similar process is used to generate probabilities for the basketball classifier 871, the soccer ball classifier 872, and the volleyball classifier 873. As shown, the baseball classifier generates an 82 percent probability that the object data 766 fits within the object class (baseball) defined by the baseball classifier 808. Similarly, the basketball classifier generates a 32 percent probability, the soccer ball classifier generates a 12 percent probability, and the volley ball classifier generates a 42 percent probability. The baseball classifier 808 is selected, for example, as having the highest probability and/or that exceeds a predefined margin (e.g., walking the classifier tree 850 along path connector 895c). As such, a determination is inferred that the target object (e.g., baseball 765) as represented by the object data 766 fits within the baseball object class as represented by baseball classifier 808, and is a baseball.

In one embodiment, the tree of classifiers 850, having a parent node as the round objects classifier 835, is walked by matching classifiers at each level that generate probabilities exceeding a threshold. The end classifier (e.g., baseball classifier 808) is selected as being located at the deepest level of the tree of classifiers 850. If more than one classifier having probabilities exceeding the predefined threshold is located at the deepest level, the classifier having the highest probability is selected as the end classifier. For example, an image with one or more objects are input into a classifier hierarchy including generic classifiers, as previously introduced. The generic classifiers having an output probability exceeding a predefined margin are placed into or remain in an active list, and their child classifier nodes (in the corresponding tree of child nodes or classifiers) will be executed recursively. Generic classifiers in the active list not exceeding the predefined margin are removed from the active list, and their child nodes are removed recursively (e.g., not executed). An object (or scene) description is composed of classifiers currently in the active list, as objects belonging to classes of classifiers in the active list are being observed.

In one embodiment, the classifier hierarchy, as described in FIG. 8C for example, is easily modifiable without altering the remaining classifiers of the hierarchy. That is, the hierarchical vision system including the classifier hierarchy is modular, such that any part can be changed without altering the rest of the system. For instance, any parent or generic classifier or child classifier can be modified (e.g., edited, removed, moved, etc.) without changing the other classifiers. Also, new parent or generic classifiers or child classifiers can be added to the classifier hierarchy without modifying the other classifiers. Because the classifier hierarchy is modular, modifications to the tree do not require additional retraining (e.g., use of artificial intelligence to build the modifications to the classifier hierarchy. That is, the classifier hierarchy is scalable and is configured to introduce new classifiers at any level. In that manner, new object classes (e.g., parent or generic class) and their corresponding subclasses (e.g., variants or object classes of the parent class) can be added to the tree, or removed from the tree.

Traversal of the classifier hierarchy can be performed quickly and using limited resources. That is, identification of characteristics of an object using a tree search saves computational resources, such that traversal may be performed using limited resources. Once the classifier hierarchy is built, traversal of the tree can be performed (e.g., using a programmable processor, application specific or pre-programmed processor or chip, etc.) without requiring the use of GPU processors, such as in an artificial intelligence mode. Instead, analysis of captured data is performed via traversal of the classifier hierarchy organized into levels of simple classifiers. Traversal of the tree occurs through the detection of classifiers at the root level (more generic object types, such as a round object) and downwards to sub-classifiers having features that define a specific variant of the object class (e.g., baseball variant of the ball object class).

In one embodiment, one or more identified objects within the scene may further provide contextualization to the corresponding scene. For example, objects that may be identified in scene 700 may include a dog, a ball, a human. Contextualization of these objects may illustrate a human playing fetch with the dog.

In one embodiment, an active list of recently identified parent or generic classifiers, and an inactive list including parent or generic classifiers that have not been recently identified are used to make the traversal of the classifier hierarchy (e.g., tree 820) more efficient and faster. In particular, only a few parent or generic classifiers of the of the classifier hierarchy in the active list are first tried and/or sampled (e.g., on data of an object of a scene in a video frame). These parent or generic classifiers are included in the active list 815 defining objects that have recently been searched. The remaining parent or generic classifiers are included in the inactive list defining parent classes of objects that have not recently been searched. In other words, the inactive list contains stale parent or generic classifiers.

During the search, if a parent or generic classifier from the active list does not give a positive outcome, then that classifier may be moved to the inactive list. In addition, classifiers on the inactive list are tried or sampled, one at a time, after the classifiers in the active list have been tried or sampled, one at a time (and probably failed). In that case, if a classifier in the inactive list gives a positive outcome, then that parent or generic classifier may be moved to the active list. The active list and inactive list provide an efficient way to search and traverse the classifier hierarchy by avoiding paths that lead to stale objects. That is, in the classifier hierarchy, if a parent or generic classifier is on the active list, it gives its sub-classifiers a higher chance of being considered in the search. In one embodiment, higher prioritized contexts are associated with objects that are more recently searched than objects associated with contexts of lower priority. As such, the higher priority parent or generic classifiers associated with the higher priority contexts have a better chance of corresponding to objects in the same context, than an object with a lower prioritized context.

Figure 9:
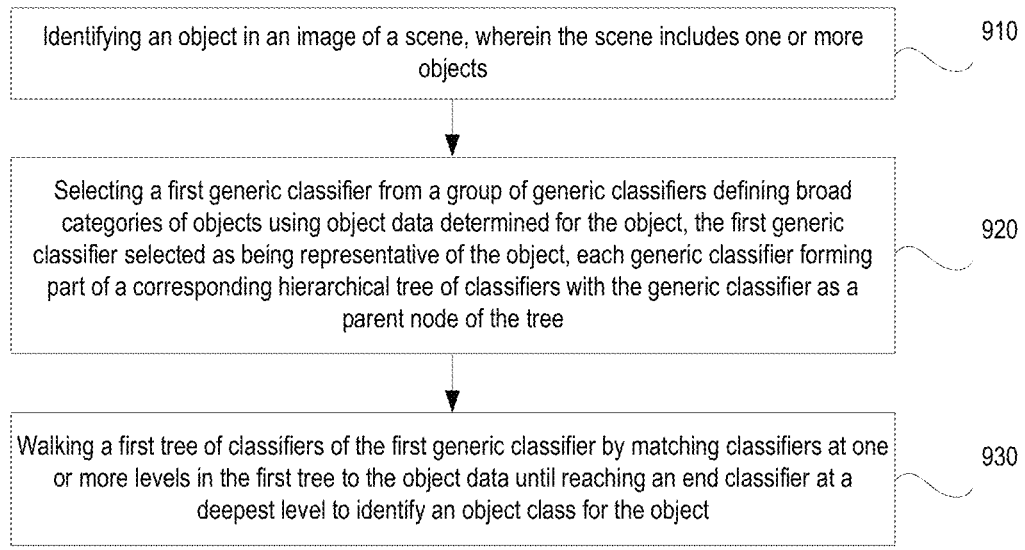
FIG. 9 is a flow diagram illustrating a method for object identification using a classifier hierarchy of various types of characteristics (e.g., visual, audio, textual, etc.) built through artificial intelligence, in accordance with one embodiment of the present disclosure.

With the detailed description of the various modules of an autonomous personal companion, flow diagram 900 of FIG. 9 discloses a method for object identification using a classifier hierarchy of various types of characteristics (e.g., visual, audio, textual, etc.) built through artificial intelligence, in accordance with one embodiment of the present disclosure. Flow diagram 900 may be implemented within a companion 100 (e.g., within AI engine 190), previously described and/or in combination with a back-end server 140, as previously described. In another embodiment, flow diagram 900 may be implemented using the programmable or application specific or pre-programmed processor of companion 100.

At 910, the method includes identifying an object in an image of a scene. This may include capturing data of a scene, wherein the scene includes one or more objects. In particular, an autonomous personal companion is configured to capture various types of data relating to an environment, such as the environment in which a user is located. That is, the captured data includes data related to the user and/or the environment within which the user is located. In one embodiment, the data is captured by an autonomous personal companion that provides services for the user. For example, the personal companion may be continually capturing data of the environment in order to contextualize the experience of the user. In one embodiment, the autonomous personal companion may be configured to capture video and/or image data (e.g., to collect visual data) relating to an environment, such as the environment in which a user is located. In one embodiment, the personal companion may be continually capturing video/image data of the environment in order to contextualize the experience of the user. Contextualization allows the personal companion to provide relevant services to the user (e.g., without user input) and/or better understand requests from the user (placing a request within the current context of the environment within which the request was made). In another embodiment, the personal companion is capturing the data relating to the environment at the request of the user.

The captured data may be of any type that is relevant for contextualizing the environment. For example, the data may include captured audio and visual data related to the user and/or environment. An image capturing system of the autonomous personal companion may be used to capture video and/or image data of a particular scene of the environment, wherein the scene may be one moment of time, or sequential moments in time. The image capturing system may be manipulated to best capture the data, such as moving the lens of the system to focus on a particular object, moving the lens to avoid glare, adjusting the settings of the lens to capture data with the least amount of noise, etc. In addition, other types of data may be captured for purposes of identifying objects. For example, captured data may include image data, video data, audio data, text data, temperature data, pressure data, infrared data, sonic data, subsonic data, supersonic data, etc.

In one embodiment, at least one of the actions involving the capturing of data includes moving the autonomous personal companion. As previously described for illustrations purposes only, movement may include positioning the personal companion closer to the user and/or subject object in order to be in a better position for collecting data. With regards to the user, the personal companion may be moving for various purposes, including but not limited to being in a better position for communicating with the user; following the user, such that as the user moves throughout a room or a house or building, the personal companion also moves with the user; positioning the personal companion in a location that facilitates projection of images onto a displayable surface (e.g., wall of a room); etc. Similarly, the personal companion may be moved to best capture the data related to the environment, including moving closer to an object, moving out of the glare of sunlight, moving away from a blocking object, etc. In one implementation, an image capturing system of the personal companion may be manipulated to best capture the data, such as moving the lens of the system to focus on a particular object, moving the lens to avoid glare, adjusting the settings of the lens to capture data with the least amount of noise, etc.

In particular, the captured data is analyzed to isolate data relating to the object. This may be performed in post-processing, or at the time of data capture. For instance, the capture system may be manipulated to capture mostly data relating to the first object (e.g., focusing the lens to a target area mostly including the first object). On the other hand, in post-processing, the captured data is parsed to determine only data relevant to the first object.

At 920, the method includes selecting a first generic classifier from a group of generic classifiers defining broad categories of objects using object data determined for the object, the first generic classifier selected as being representative of the object, each generic classifier forming part of a corresponding hierarchical tree of classifiers with the generic classifier as a parent node of the tree.

As previously described, the first generic classifier may be selected by determining a plurality of probabilities generated by executing each of the group of generic classifiers using the input data. Each generic classifier includes a corresponding set of weights that define an internal representation of a corresponding object class (e.g., the baseball classifier includes weights that define a baseball). The corresponding set of weights is learned from corresponding training data supplied to a neural network, for example. Each generic classifier generates a probability that the input data belongs to the object class represented by and using the weights of the corresponding generic classifier. In particular, from the group of generic classifiers, the first generic classifier has the highest probability and/or exceeds a predefined margin and as such, the input is matched to the first generic classifier.

At 930, the method includes walking a first tree of classifiers (e.g., tree of child nodes under the parent node) of the first generic classifier (e.g., the parent node) by matching classifiers at one or more levels in the first tree to the object data until reaching an end classifier (baseball classifier) at a deepest level to identify an object class (e.g., baseball) for the object (a baseball in the scene). The first tree includes one or more hierarchical levels of classifiers under the parent classifier such that succeeding lower levels include more specific classifiers trained using more specific training data. In addition, each classifier in the first tree includes a corresponding set of weights computed during training using appropriate training data.

The walking includes beginning with a next highest level that is directly below the first generic classifier, at least one probability is determined, wherein the at least one probability is generated by executing one or more classifiers of the next highest level using the object data. The object data is matched to a matched classifier of that level having the highest probability and/or exceeds a predefined margin. If there is an adjacent lower level connected to the matched classifier, then the adjacent lower level is labeled as the next highest level. The process is recursively performed using the next highest level until there is no further adjacent or lower level, wherein the last matched classifier is the end classifier.

In one embodiment, the walking includes selecting and/or matching classifiers at each level that exceed a predefined margin, and recursively applying the method at each level until reaching a deepest level. The end classifier (e.g., baseball classifier 808) is selected as being located at the deepest level of the tree of classifiers. If more than one classifier having probabilities exceeding the predefined threshold is located at the deepest level, the classifier having the highest probability is selected as the end classifier.

In one embodiment, the traversal of the classifier hierarchy may be filtered by implementing active and inactive lists of parent or generic classifiers. The active list includes parent or generic classifiers that are associated with parent classes of objects that include objects that have been recently identified using the classifier hierarchy. In other embodiments, the active list includes parent or generic classifiers that are associated with contextualizations of environments that include objects that have been identified using the classifier hierarchy. On the other hand, the inactive list includes parent or generic classifiers that are associated with objects that have not been recently identified (e.g., stale objects) using the classifier hierarchy. That is, these objects may be associated with contextualizations of environments that have not been recently encountered by the personal companion. For example, if it is late in the evening, an earlier contextualization may be the user is getting ready for work, and objects related to that contextualization would not be relevant to any current contextualization of the environment occurring late in the day (e.g., relaxing and playing a gaming application on a gaming console). As such, the method may include analyzing the parent or generic classifiers in the active list corresponding to current contextualizations before analyzing parent or generic classifiers in the inactive list. As such, because parent or generic classifiers on the inactive list may not be analyzed less computation is required, as stale parent or generic classifiers are not first considered in the first pass through the parent or generic classifiers.

In particular, an active list of recently identified parent or generic classifiers may be used to make the traversal of the classifier hierarchy (e.g., tree 820) more efficient and faster. In particular, a first subset of probabilities is determined by executing classifiers in an active list of generic classifiers including classifiers having relevant classifiers that have recently identified objects. When the first generic classifier in the active list, the object data is matched to the first generic classifier having the highest probability and/or exceeding a predefined threshold within the first subset of probabilities.

Also, active list of recently identified parent or generic classifiers and an inactive list of parent or generic classifiers may be used to make the traversal of the classifier hierarchy (e.g., tree 820) more efficient and faster. In particular, classifiers in an active list of generic classifiers including classifiers having relevant classifiers that have recently identified objects are executed to determine a first subset of probabilities. It may be determined that the object data may not match any classifier in the active list (e.g., does not meet a threshold). As such, classifiers in the inactive list of generic classifiers including less relevant classifiers may be executed to determine a second subset of probabilities. When the first generic classifier is in the inactive list, the object data is matched to the first generic classifier having the highest probability and/or exceeding a predefined threshold within the second subset of probabilities.

Figure 10:
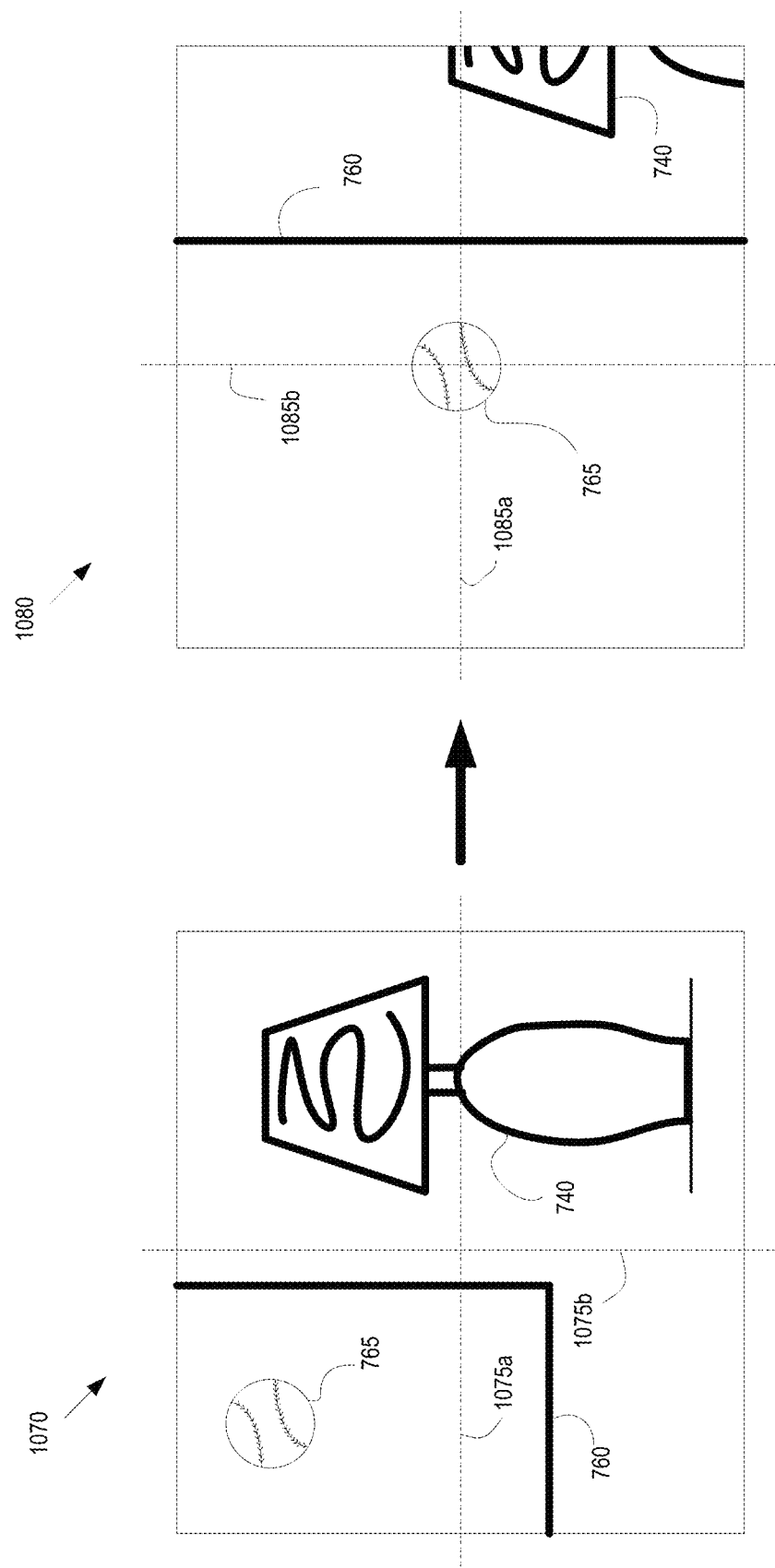
FIG. 10 is an illustration of the targeting of an object within an image frame for purposes of identifying the object using a classifier hierarchy of visual characteristics build through artificial intelligence, in accordance with one embodiment of the present disclosure.

FIG. 10 is an illustration of the targeting of an object within an image frame for purposes of identifying the object using a classifier hierarchy of visual characteristics built through artificial intelligence, in accordance with one embodiment of the present disclosure. In one embodiment, the image capturing system of the personal companion is manipulated to focus in on a target area, wherein the target area may include an object in the scene. This may be implemented by centering the target area in the center of the image when capturing the image. This may be performed to focus the captured data to analyze only data relevant to the object. In one implementation, the image data is targeted to only include relevant data before processing, such as by zooming into the first object, or by moving the personal companion to a location closer to the first object. In other implementations, the image data is analyzed through post-processing to identify relevant data associated with the first object from the set of captured data. For example, the object may be centered in the captured image. As shown in FIG. 10, a first captured image 1070 may include an image first introduced in FIG. 7 that is captured and/or framed between lines 741*a*-741*b*. The first captured image 1070 includes a portion of display 760 that is showing a digital image of a baseball 765. In addition, the first captured image 1070 may include lamp 740 that is placed onto a table. As shown, vertical line 1075*b* and horizontal line 1075*a* form a reference system used to identify a center of the captured image 1070, wherein the baseball 765 is off-center.

The baseball 765 may be determined as the object of interest for purposes of identification, and as such, the unidentified object 765 may be centered within the newly captured or modified image frame 1080, either through a second recapture of an image (e.g., manipulating the image capture system or companion), or through post-processing. As such, ball 765 is now centered in the captured image frame 1080, as indicated by the reference system including vertical line 1085*b* and horizontal line 1085*a*. While lamp 740 was completely in image frame 1070, in image frame 1080, only a portion of lamp 740 is captured. Additional manipulation and/or editing (e.g., manipulate the image capture system and/or post processing) may be performed to further isolate the captured image frame to only include baseball 765.

Accordingly, in various embodiments the present disclosure describes systems and methods configured for identifying objects within a scene as captured by an autonomous personal companion and using a hierarchy of classifiers that when traversed can identify an object of interest.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method of identification, comprising:
   capturing an image of a scene using an autonomous personal companion providing services to a user, wherein the scene is taken from a physical environment including the user;
   identifying at the autonomous personal companion an object in the image of the scene;
   determining a contextualization of the physical environment and the user based on a current time period;
   filtering a plurality of generic classifiers of a classifier hierarchy independent of the object that is identified based on the contextualization of the physical environment and the user to obtain a group of generic classifiers that is active for the current time period, wherein each of the group of generic classifiers that is active has been searched for purposes of identifying one or more objects for the user;
   determining a first plurality of probabilities that the object matches generic classifiers in the group of generic classifiers;
   selecting at the autonomous personal companion a first generic classifier from the group of generic classifiers defining broad categories of objects using object data determined for the object obtained from the image, the first generic classifier selected as being representative of the object and having a highest probability of the first plurality of probabilities that meets a threshold probability, the each of the group of generic classifiers defining a corresponding parent node of a corresponding hierarchical tree of classifiers; and
   walking a first hierarchical tree of classifiers of the first generic classifier by matching classifiers at one or more levels in the first hierarchical tree of classifiers to the object data until reaching an end classifier at a deepest level to identify an object class for the object, wherein at each level of the first hierarchical tree of classifiers including one or more sub-classifiers for the each level determining a second plurality of probabilities that the object matches the one or more sub-classifiers for the each level and selecting a sub-classifier for the each level having a highest probability of the second plurality of probabilities that meets the threshold probability.

2. The method of claim 1, wherein the selecting at the autonomous personal companion the first generic classifier includes:
   generating the first plurality of probabilities by executing the group of generic classifiers, wherein each of the first plurality of probabilities defines how closely the object data matches a corresponding generic classifier; and
   matching the object data to the first generic classifier, wherein the first generic classifier generates the highest probability in the first plurality of probabilities.

3. The method of claim 2, wherein the determining the first plurality of probabilities includes:
   generating a first subset of probabilities by executing classifiers in an active list of generic classifiers including classifiers having recently identified object classes, the first generic classifier being in the active list; and
   matching the object data to the first generic classifier generating the highest probability in the first subset of probabilities.

4. The method of claim 1, wherein the selecting at the autonomous personal companion the first generic classifier includes:
   generating the first plurality of probabilities generated by executing the group of generic classifiers, wherein each of the first plurality of probabilities defines how closely the object data matches a corresponding generic classifier; and
   for each generic classifier in the group of generic classifiers generating probabilities exceeding a margin, walking a second corresponding hierarchical tree of classifiers by matching classifiers at one or more levels in the second corresponding hierarchical tree of classifiers to the object data, the classifiers that are matched generating probabilities exceeding the margin, wherein the end classifier of the first hierarchical tree of classifiers of the first generic classifier is at the deepest level of all corresponding trees of classifiers.

5. The method of claim 1, wherein the walking the first hierarchical tree of classifiers of the first generic classifier includes:
walking the first hierarchical tree of classifiers until reaching the end classifier at the deepest level to identify the object class, the first hierarchical tree of classifiers including one or more hierarchical levels of classifiers under a parent node such that succeeding lower levels include more specific classifiers trained using more specific training data, each classifier in the first hierarchical tree of classifiers comprising a corresponding set of weights based on corresponding training data, wherein the walking the first hierarchical tree of classifiers until reaching the end classifier at the deepest level includes,
beginning with a next highest level directly below the first generic classifier as the parent node, determining at least one probability generated by executing one or more classifiers of the next highest level using the object data;
matching the object data to a matched classifier of the next highest level generating the highest probability;
determining if an adjacent lower level is connected to the matched classifier;
labeling the adjacent lower level as the next highest level; and
recursively performing until there is no adjacent lower level, wherein a last occurring matched classifier is the end classifier.

6. The method of claim 1, further comprising:
capturing the image of the scene using an image capturing system of the autonomous personal companion; and
moving the autonomous personal companion closer to the object to better capture the object in the image.

7. The method of claim 6, further comprising:
identifying a target area of the image, wherein the target area includes the object; and
centering the target area to a center of the image when performing the capturing the image.

8. The method of claim 1, further comprising:
modifying the first hierarchical tree of classifiers by removing an existing classifier or adding a new classifier.

9. A non-transitory computer-readable medium storing a computer program for implementing a method of identification, the computer-readable medium comprising:
program instructions for capturing an image of a scene using an autonomous personal companion providing services to a user, wherein the scene is taken from a physical environment including the user;
program instructions for identifying at the autonomous personal companion an object in the image of the scene;
program instructions for determining a contextualization of the physical environment and the user based on a current time period;
program instructions for filtering a plurality of generic classifiers of the classifier hierarchy independent of the object that is identified based on the contextualization of the physical environment and the user to obtain a group of generic classifiers that is active for the current time period, wherein each of the group of generic classifiers that is active has been searched for purposes of identifying one or more objects for the user;
program instructions for determining a first plurality of probabilities that the object matches generic classifiers in the group of generic classifiers;
program instructions for selecting at the autonomous personal companion a first generic classifier from the group of generic classifiers defining broad categories of objects using object data determined for the object obtained from the image, the first generic classifier selected as being representative of the object and having a highest probability of the first plurality of probabilities that meets a threshold probability, the each of the group of generic classifiers defining a corresponding parent node of a corresponding hierarchical tree of classifiers; and
program instructions for walking a first hierarchical tree of classifiers of the first generic classifier by matching classifiers at one or more levels in the first hierarchical tree of classifiers to the object data until reaching an end classifier at a deepest level to identify an object class for the object, wherein at each level of the first hierarchical tree of classifiers including one or more sub-classifiers for the each level determining a second plurality of probabilities that the object matches the one or more sub-classifiers for the each level and selecting a sub-classifier for the each level having a highest probability of the second plurality of probabilities that meets the threshold probability.

10. The computer-readable medium of claim 9, wherein the program instructions for selecting at the autonomous personal companion the first generic classifier includes:
program instructions for generating the first plurality of probabilities by executing the group of generic classifiers, wherein each of the first plurality of probabilities defines how closely the object data matches a corresponding generic classifier; and
program instructions for matching the object data to the first generic classifier, wherein the first generic classifier generates the highest probability in the first plurality of probabilities.

11. The computer-readable medium of claim 10, wherein the program instructions for determining the first plurality of probabilities includes:
program instructions for generating a first subset of probabilities by executing classifiers in an active list of generic classifiers including classifiers having recently identified object classes, the first generic classifier being in the active list; and
program instructions for matching the object data to the first generic classifier generating the highest probability in the first subset of probabilities.

12. The computer-readable medium of claim 9, wherein the program instructions for walking the first hierarchical tree of classifiers of the first generic classifier includes:
program instructions for walking the first hierarchical tree of classifiers until reaching the end classifier at the deepest level to identify the object class, the first hierarchical tree of classifiers including one or more hierarchical levels of classifiers under a parent node such that succeeding lower levels include more specific classifiers trained using more specific training data, each classifier in the first hierarchical tree of classifiers comprising a corresponding set of weights based on corresponding training data, wherein the program instructions for walking the first hierarchical tree of classifiers until reaching the end classifier at the deepest level includes,
program instructions for beginning with a next highest level directly below the first generic classifier as the parent node, program instructions for determining at least one probability generated by executing one or more classifiers of the next highest level using the object data;

program instructions for matching the object data to a matched classifier of the next highest level generating the highest probability;

program instructions for determining if an adjacent lower level is connected to the matched classifier;

program instructions for labeling the adjacent lower level as the next highest level; and program instructions for recursively performing until there is no adjacent lower level, wherein a last occurring matched classifier is the end classifier.

13. The computer-readable medium of claim 9, further comprising:

program instructions for capturing the image of the scene using an image capturing system of the autonomous personal companion; and program instructions for moving the autonomous personal companion closer to the object to better capture the object in the image.

14. The computer-readable medium of claim 9, further comprising:

program instructions for modifying the first hierarchical tree of classifiers by removing an existing classifier or adding a new classifier.

15. A computer system comprising:

a processor; and memory coupled to the processor and having stored therein instructions that, if executed by the computer system, cause the computer system to execute a method of identification comprising:

capturing an image of a scene using an autonomous personal companion providing services to a user, wherein the scene is taken from a physical environment including the user;

identifying at the autonomous personal companion an object in the image of the scene;

determining a contextualization of the physical environment and the user based on a current time period;

filtering a plurality of generic classifiers of the classifier hierarchy independent of the object being identified based on the contextualization of the physical environment and the user to obtain a group of generic classifiers that is active for the current time period, wherein each of the group of generic classifiers that is active has been searched for purposes of identifying one or more objects for the user;

determining a first plurality of probabilities that the object matches generic classifiers in the group of generic classifiers;

selecting at the autonomous personal companion a first generic classifier from the group of generic classifiers defining broad categories of objects using object data determined for the object obtained from the image, the first generic classifier selected as being representative of the object and having a highest probability of the first plurality of probabilities that meets a threshold probability, the each of the group of generic classifiers defining a corresponding parent node of a corresponding hierarchical tree of classifiers; and walking a first hierarchical tree of classifiers of the first generic classifier by matching classifiers at one or more levels in the first hierarchical tree of classifiers to the object data until reaching an end classifier at a deepest level to identify an object class for the object, wherein at each level of the first hierarchical tree of classifiers including one or more sub-classifiers for the each level determining a second plurality of probabilities that the object matches the one or more sub-classifiers for the each level and selecting a sub-classifier for the each level having a highest probability of the second plurality of probabilities that meets the threshold probability.

16. The computer system of claim 15, wherein the selecting at the autonomous personal companion the first generic classifier includes:

generating the first plurality of probabilities by executing the group of generic classifiers, wherein each of the first plurality of probabilities defines how closely the object data matches a corresponding generic classifier; and matching the object data to the first generic classifier, wherein the first generic classifier generates the highest probability in the first plurality of probabilities.

17. The computer system of claim 16, wherein the determining the first plurality of probabilities in the method includes:

generating a first subset of probabilities by executing classifiers in an active list of generic classifiers including classifiers having recently identified object classes, the first generic classifier being in the active list; and matching the object data to the first generic classifier generating the highest probability in the first subset of probabilities.

18. The computer system of claim 15, wherein the walking the first hierarchical tree of classifiers of the first generic classifier includes:

walking the first hierarchical tree of classifiers until reaching the end classifier at the deepest level to identify the object class, the first hierarchical tree of classifiers including one or more hierarchical levels of classifiers under a parent node such that succeeding lower levels include more specific classifiers trained using more specific training data, each classifier in the first hierarchical tree of classifiers comprising a corresponding set of weights based on corresponding training data, wherein the walking the first hierarchical tree of classifiers until reaching the end classifier at the deepest level includes, beginning with a next highest level directly below the first generic classifier as the parent node, determining at least one probability generated by executing one or more classifiers of the next highest level using the object data;

matching the object data to a matched classifier of the next highest level generating the highest probability;

determining if an adjacent lower level is connected to the matched classifier;

labeling the adjacent lower level as the next highest level; and recursively performing until there is no adjacent lower level, wherein a last occurring matched classifier is the end classifier.

19. The computer system of claim 15, the method further comprising:

capturing the image of the scene using an image capturing system of the autonomous personal companion; and moving the autonomous personal companion closer to the object to better capture the object in the image.

20. The computer system of claim 15, the method further comprising:

modifying the first hierarchical tree of classifiers by removing an existing classifier or adding a new classifier.

* * * * *